United States Patent
Ikuta et al.

(10) Patent No.: US 9,136,746 B2
(45) Date of Patent: Sep. 15, 2015

(54) STATOR FOR ELECTRIC ROTATING MACHINE AND METHOD OF MANUFACTURING THE SAME

(71) Applicant: DENSO CORPORATION, Kariya, Aichi-pref. (JP)

(72) Inventors: Hiroyuki Ikuta, Anjo (JP); Yuusuke Hara, Anjo (JP); Nobuyuki Kimura, Kitanagoya (JP); Kuniharu Teshima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/315,344

(22) Filed: Jun. 26, 2014

(65) Prior Publication Data

US 2014/0306573 A1    Oct. 16, 2014

Related U.S. Application Data

(62) Division of application No. 13/347,892, filed on Jan. 11, 2012.

(30) Foreign Application Priority Data

Jan. 11, 2011 (JP) .................................. 2011-003061
Mar. 28, 2011 (JP) .................................. 2011-070906
Dec. 9, 2011 (JP) .................................. 2011-270573

(51) Int. Cl.
 *H02K 1/18*    (2006.01)
 *H02K 15/02*   (2006.01)
 (Continued)

(52) U.S. Cl.
 CPC ............... *H02K 15/02* (2013.01); *H02K 1/148* (2013.01); *H02K 1/185* (2013.01); *H02K 15/024* (2013.01); *H02K 15/066* (2013.01); *Y10T 29/49009* (2015.01)

(58) Field of Classification Search
 CPC ........................................................ H02K 1/185
 USPC .................... 310/216.101, 216.114, 216.113, 310/216.124, 216.128, 216.131–216.135
 See application file for complete search history.

(56) References Cited

U.S. PATENT DOCUMENTS 4,145,626 A * 3/1979 Aroshidze et al. .............. 310/91
5,796,190 A   8/1998 Takeda et al.

(Continued)

FOREIGN PATENT DOCUMENTS

JP   55-010853   1/1980
JP   55-019448   2/1980

(Continued)

OTHER PUBLICATIONS

Office Action (2 pages) dated Jan. 22, 2013, issued in corresponding Japanese Application No. 2011-270573 and English translation (2 pages).

(Continued)

*Primary Examiner* — Naishadh Desai
(74) *Attorney, Agent, or Firm* — Nixon & Vanderhye P.C.

(57) ABSTRACT

A stator includes a hollow cylindrical stator core comprised of a plurality of stator core segments, a stator coil mounted on the stator core, and an outer cylinder that is fitted on the radially outer surfaces of the stator core segments so as to fasten the stator core segments together. The stator core has a recess formed in the radially outer surface of one of the stator core segments. The outer cylinder has a slit that radially penetrates the outer cylinder to connect the radially outer and inner surfaces of the outer cylinder and an engaging portion that adjoins the slit. The engaging portion of the outer cylinder is plastically deformed radially inward into the recess of the stator core so as to abut and thereby engage with side walls of the recess which face the engaging portion.

14 Claims, 19 Drawing Sheets

(51) Int. Cl.
*H02K 1/14* (2006.01)
*H02K 15/06* (2006.01)

(56) References Cited

U.S. PATENT DOCUMENTS

| | | | |
|---|---|---|---|
| 5,945,759 A * | 8/1999 | Tanaka et al. | 310/90 |
| 7,511,399 B2 | 3/2009 | Lung et al. | |
| 7,737,597 B2 | 6/2010 | Jajtic et al. | |
| 2004/0074077 A1 | 4/2004 | Gehring et al. | |
| 2007/0273239 A1* | 11/2007 | Kobayashi et al. | 310/217 |
| 2009/0289522 A1* | 11/2009 | Buban | 310/216.113 |
| 2010/0156235 A1* | 6/2010 | Qin et al. | 310/216.113 |
| 2010/0320865 A1 | 12/2010 | Bauch et al. | |
| 2011/0169367 A1* | 7/2011 | Bourqui et al. | 310/216.009 |
| 2012/0175996 A1 | 7/2012 | Ikuta et al. | |

FOREIGN PATENT DOCUMENTS

| | | |
|---|---|---|
| JP | 2003-164080 A | 6/2003 |
| JP | 2004-523199 A | 7/2004 |
| JP | 2005-278292 A | 10/2005 |
| JP | 2007-043845 | 2/2007 |
| JP | 2007-189783 A | 7/2007 |
| JP | 2007-189784 A | 7/2007 |
| JP | 2007-189785 A | 7/2007 |
| JP | 2007-189786 A | 7/2007 |
| JP | 2007-221944 | 8/2007 |
| JP | 2007-522786 | 8/2007 |
| JP | 2009-225504 A | 10/2009 |
| JP | 4562093 | 8/2010 |
| JP | 4627701 | 11/2010 |

OTHER PUBLICATIONS

Office Action (2 pages) dated Feb. 21, 2013, issued in corresponding Japanese Application No. 2011-070906 and English translation (3 pages).
Office Action (1 pages) dated Sep. 12, 2013, issued in corresponding Japanese Application No. 2011-270573 and English translation (1 page).
Office Action (10 pages) dated Sep. 12, 2014 issued in corresponding U.S. Appl. No. 13/347,892, filed Jan. 11, 2012.
Office Action issued in U.S. Appl.No. 13/347,892 dated Mar. 24, 2015.

* cited by examiner

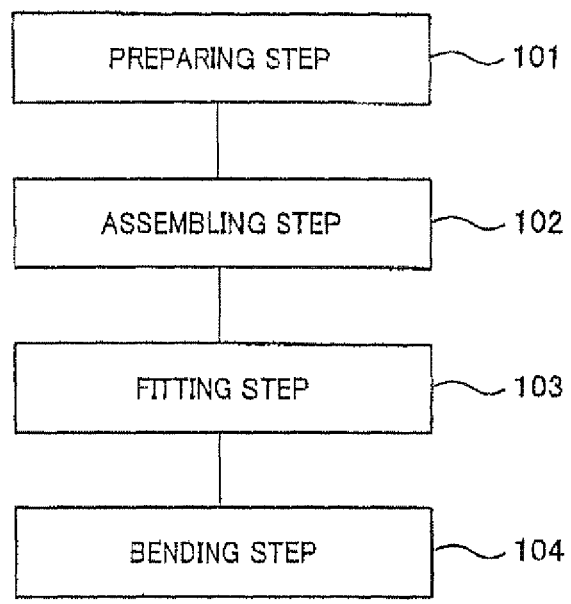
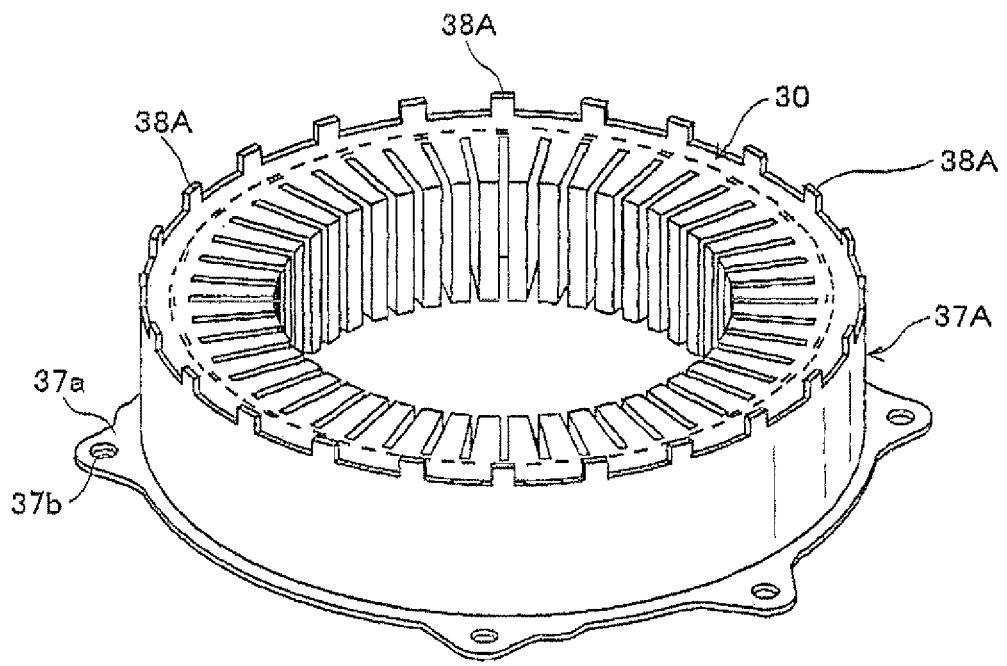

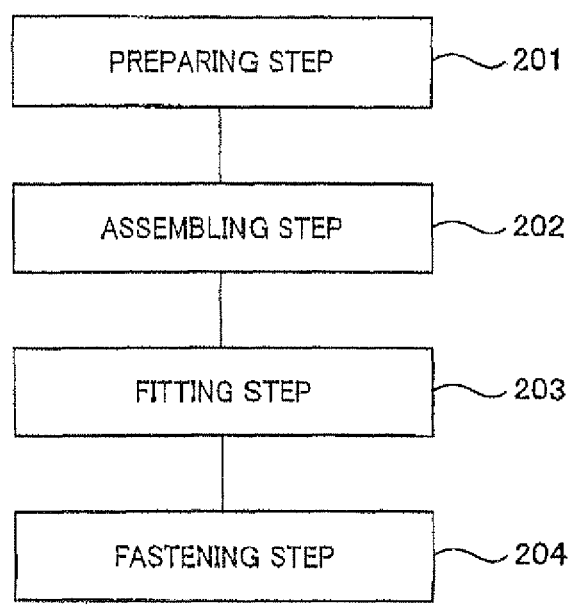

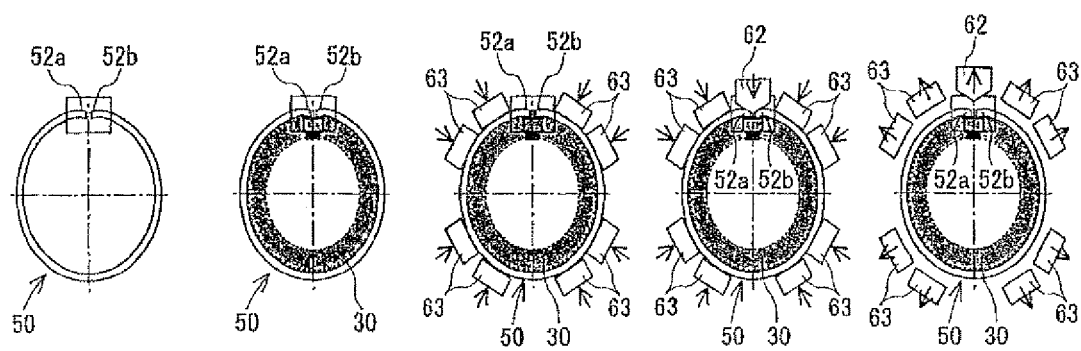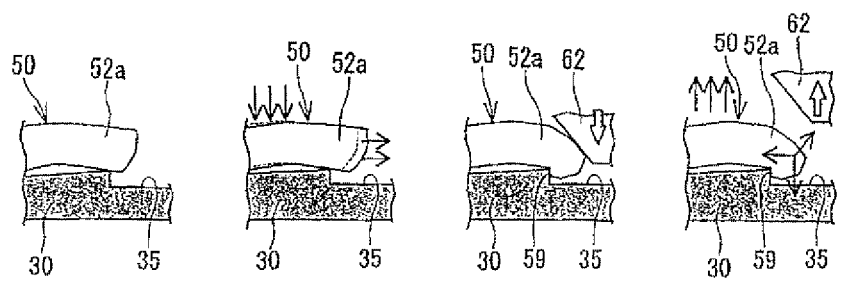

STATOR FOR ELECTRIC ROTATING MACHINE AND METHOD OF MANUFACTURING THE SAME

CROSS-REFERENCE TO RELATED APPLICATIONS

This application is a Division of application Ser. No. 13/347,892, filed Jan. 11, 2012 and is based on and claims priority from Japanese Patent Applications No. 2011-3061 filed on Jan. 11, 2011, No. 2011-70906 filed on Mar. 28, 2011 and No. 2011-270573 filed on Dec. 9, 2011, the contents of which are hereby incorporated by reference in their entireties into this application.

BACKGROUND

1. Technical Field

The present invention relates to stators for electric rotating machines that are used in, for example, motor vehicles as electric motors and electric generators, and to methods of manufacturing the stators.

2. Description of Related Art

Conventionally, there are known stators for electric rotating machines which include a hollow cylindrical stator core, a stator coil, and an outer cylinder.

The stator core is comprised of a plurality of stator core segments that are arranged in the circumferential direction of the stator core to adjoin one another in the circumferential direction. Further, to reduce iron loss of the stator, each of the stator core segments is formed by laminating a plurality of magnetic steel sheets in the axial direction of the stator core. Moreover, the stator core has a plurality of slots that are formed in the radially inner surface of the stator core so as to be spaced from one another in the circumferential direction of the stator core. The stator coil is mounted on the stator core so as to be received in the slots of the stator core. The outer cylinder is fitted on the radially outer surfaces of the stator core segments so as to fasten them together.

Moreover, there is also known a method of shrink-fitting the outer cylinder on the radially outer surfaces of the stator core segments. More specifically, according to the method, the inner diameter of the outer cylinder is set to be less than the outer diameter of the stator core. In the shrink-fitting process, the outer cylinder is first heated, thereby causing the inner diameter of the outer cylinder to become greater than the outer diameter of the stator core. Then, the outer cylinder is fitted onto the radially outer surfaces of the stator core segments all of which together make up the radially outer surface of the stator core. Thereafter, the outer cylinder is cooled at room temperature until the difference in temperature between the outer cylinder and the stator core segments becomes zero. As a result, the stator core segments are fixed together by the fastening force of the outer cylinder However, with the above method, the fastening force of the outer cylinder is applied radially inward to the stator core segments, inducing compressive stress in the stator core segments in the circumferential direction of the stator core. The compressive stress may deteriorate the magnetic characteristics of the stator core, thereby lowering the performance of the electric rotating machine.

Japanese Patent Application Publication No. 2007-189786 discloses a stator in which the stator core segments are each made of a powder compact (or green compact) so as to reduce the iron loss of the stator. Moreover, to fix the stator core segments which are received in the outer cylinder, there are formed a lower clamping portion at the lower end (i.e., one axial end) of the outer cylinder and a plurality of upper clamping portions at the upper end (i.e., the other axial end) of the outer cylinder. The upper clamping portion and the lower clamping portions together clamp the stator core segments in the axial direction of the stator core, thereby fixing the stator core segments. More specifically, the lower clamping portion is formed as an annular flange that protrudes radially inward from the radially inner surface of the outer cylinder. The lower clamping portion has the stator core segments resting thereon, so that the lower end faces of back core portions of the stator core segments are in pressed-contact with the lower clamping portion. On the other hand, the upper clamping portions are equally spaced in the circumferential direction of the outer cylinder. Each of the upper clamping portions is first raised up from the upper end of the outer cylinder and then bent downward to have a tip part thereof in pressed-contact with the upper end face of the back core portion of a corresponding one of the stator core segments.

However, with the above configuration, in operation of the electric rotating machine, magnetic flux flows also through the upper and lower clamping portions of the outer cylinder that are respectively in pressed-contact with the upper and lower end faces of the back core portions of the stator core segments, thereby increasing the iron loss of the stator.

Japanese Patent No. 4562093 discloses a stator in which the outer cylinder is fastened to the radially outer surface of the stator core by a protrusion-recess engagement. Specifically, as shown in FIG. 27, the stator core 30A has a recess 35A formed in the radially outer surface thereof, while the outer cylinder 50A has a protrusion 52A that protrudes radially inward from the radially inner surface of the outer cylinder 50A. The protrusion 52A of the outer cylinder 50A is pressed into the recess 35A of the stator core 30A by a punch 61A that is arranged radially outside of the outer cylinder 50A. Consequently, the protrusion 52A of the outer cylinder 50A is brought into contact with both the circumferential side walls of the recess 35A (i.e., the pair of interior walls of the stator core 30A which face each other in the circumferential direction of the stator core 30A with the recess 35A formed therebetween). As a result, the outer cylinder 50A and the stator core 30A are fastened together, so that they cannot rotate relative to each other.

However, with the above configuration, a large pressing load is required for the punch 61A to press the protrusion 52A of the outer cylinder 50A into the recess 35A of the stator core 30A. Consequently, in some cases, it may be difficult to secure a sufficient contact area between the protrusion 52A and the circumferential side walls of the recess 35A. As a result, without a sufficient contact area between the protrusion 52A and the circumferential side walls of the recess 35A, local stress concentration may occur in the protrusion 52A, thereby causing cracks and/or a fatigue fracture to occur in the protrusion 52A.

SUMMARY

According to an exemplary embodiment, there is provided a stator for an electric rotating machine. The stator includes a hollow cylindrical stator core, a stator coil, an outer cylinder, and a restraint. The stator core is comprised of a plurality of stator core segments that are arranged in the circumferential direction of the stator core to adjoin one another in the circumferential direction. The stator coil is mounted on the stator core. The outer cylinder is fitted on the radially outer surfaces of the stator core segments with a clearance provided between the radially outer surfaces of the stator core segments and the radially inner surface of the outer cylinder. The restraint is provided at an axial end of the outer cylinder to restrain axial movement of the stator core segments. Moreover, in the stator, each of the stator core segments has a plurality of tooth portions that radially extend and a back core portion that is positioned radially outside of the tooth portions to connect the tooth portions. The restraint is formed by bending an axial end portion of the outer cylinder radially inward. The restraint abuts only radially-outer end parts of the back core portions of the stator core segments.

According to the exemplary embodiment, there is also provided a method of manufacturing a stator for an electric rotating machine. The method includes the steps of: (1) preparing a plurality of stator core segments, a stator coil, and an outer cylinder; (2) assembling the stator core segments to the stator coil so that the stator core segments together make up a hollow cylindrical stator core; (3) fitting the outer cylinder onto the radially outer surface of the stator core with a clearance provided between the radially inner surface of the outer cylinder and the radially outer surface of the stator core, so that an axial end portion of the outer cylinder axially protrudes from an axial end face of the stator core; and (4) bending the axial end portion of the outer cylinder radially inward to abut the axial end face of the stator core, so that the axial end portion makes up a restraint that restrain axial movement of the stator core segments. Moreover, in the method, each of the stator core segments has a plurality of tooth portions that radially extend and a back core portion that is positioned radially outside of the tooth portions to connect the tooth portions. In the bending step, the axial end portion of the outer cylinder is bent radially inward so as to abut only radially-outer end parts of the back core portions of the stator core segments.

According to another exemplary embodiment, there is provided a stator for an electric rotating machine. The stator includes a hollow cylindrical stator core, a stator coil, and an outer cylinder. The stator core is comprised of a plurality of stator core segments that are arranged in the circumferential direction of the stator core to adjoin one another in the circumferential direction. The stator coil is mounted on the stator core. The outer cylinder is fitted on the radially outer surfaces of the stator core segments so as to fasten the stator core segments together. Moreover, in the stator, the stator core has a recess formed in the radially outer surface of one of the stator core segments. The outer cylinder has a slit that radially penetrates the outer cylinder to connect the radially outer and inner surfaces of the outer cylinder and an engaging portion that adjoins the slit. The engaging portion of the outer cylinder is plastically deformed radially inward into the recess of the stator core so as to abut and thereby engage with side walls of the recess which face the engaging portion.

According to another exemplary embodiment, there is also provided a method of manufacturing a stator for an electric rotating machine. The method includes the steps of: (1) preparing a plurality of stator core segments, a stator coil, and an outer cylinder; (2) assembling the stator core segments to the stator coil so that the stator core segments together make up a hollow cylindrical stator core; (3) fitting the outer cylinder onto the radially outer surface of the stator core; and (4) fastening the outer cylinder and the stator core together. Moreover, in the method, one of the stator core segments prepared in the preparing step has a recess formed in a radially outer surface thereof, so that the stator core, which is made up of the stator core segments, also has the recess formed in the radially outer surface thereof. The outer cylinder prepared in the preparing step has a slit that radially penetrates the outer cylinder to connect the radially outer and inner surfaces of the outer cylinder and an engaging portion that adjoins the slit. In the fitting step, the outer cylinder is axially fitted onto the radially outer surface of the stator core so that the engaging portion of the outer cylinder is brought into alignment with the recess of the stator core. In the fastening step, the engaging portion of the outer cylinder is plastically deformed radially inward into the recess of the stator core so as to abut and thereby engage with side walls of the recess which face the engaging portion.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 8 is a flow chart illustrating a method of manufacturing the stator according to the first embodiment;

FIG. 9 is a perspective view illustrating a fitting step of the method, wherein the stator coil is omitted and an outer cylinder is fitted on the radially outer surface of a stator core of the stator;

FIG. 17 is a flow chart illustrating a method of manufacturing the stator according to the second embodiment;

FIG. 26A is a schematic view illustrating a preliminary bending step of the method according to the sixth embodiment;

FIG. 26B1 is a schematic view illustrating a fitting step of the method according to the sixth embodiment;

FIG. 26B2 is an enlarged view of part of FIG. 26B1;

FIG. 26C1 is a schematic view illustrating a compressing step of the method according to the sixth embodiment;

FIG. 26C2 is an enlarged view of part of FIG. 26C1;

FIG. 26D1 is a schematic view illustrating a fastening step of the method according to the sixth embodiment;

FIG. 26D2 is an enlarged view of part of FIG. 26D1;

FIG. 26E1 is a schematic view illustrating a removing step of the method according to the sixth embodiment;

FIG. 26E2 is an enlarged view of part of FIG. 26E1; and

DESCRIPTION OF EMBODIMENTS

Figure 1:
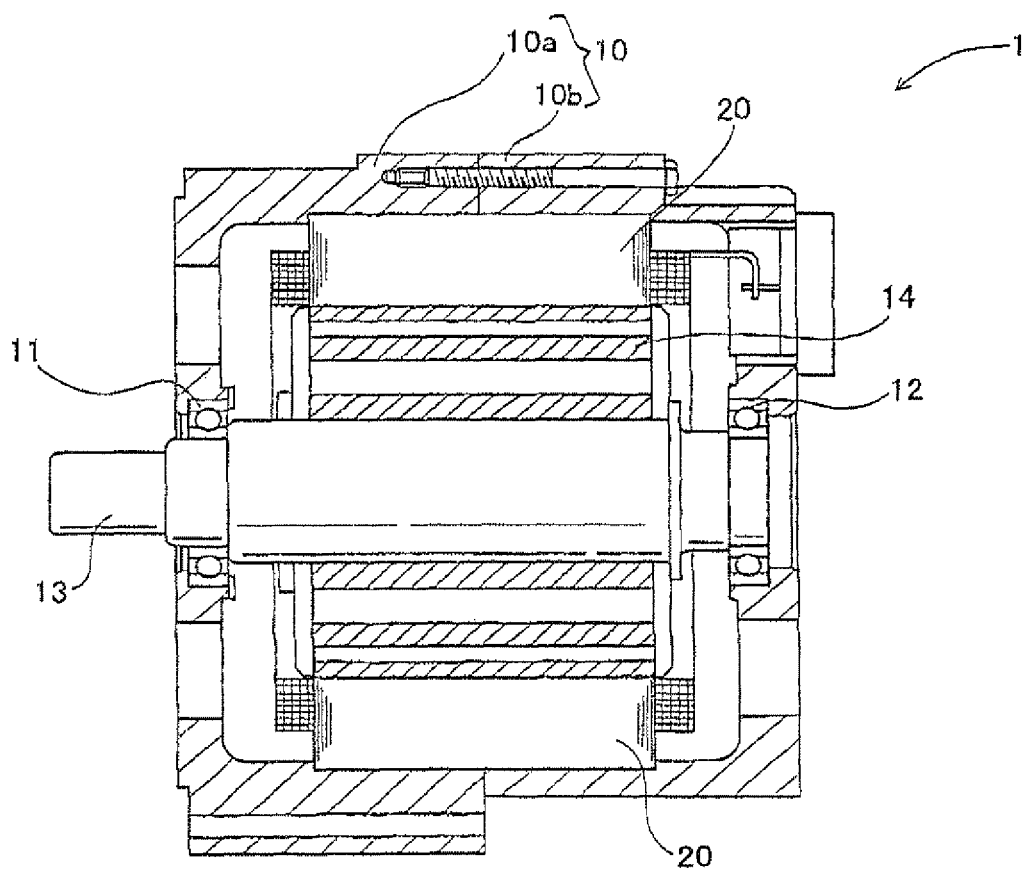
FIG. 1 is a schematic, partially cross-sectional view of an electric rotating machine which includes a stator according to a first embodiment.

Exemplary embodiments will be described hereinafter with reference to FIGS. 1-26E2. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

First Embodiment

FIG. 1 shows the overall configuration of an electric rotating machine 1 which includes a stator 20 according to a first embodiment.

In the present embodiment, the electric rotating machine 1 is configured as a motor-generator that is used in a motor vehicle (e.g., an electric vehicle or a hybrid vehicle) to function both as an electric motor and as an electric generator.

As shown in FIG. 1, the electric rotating machine 1 further includes a housing 10 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that form a plurality of magnetic poles on the radially outer periphery of the rotor 14 to face the radially inner periphery of the stator 20. The polarities of the magnetic poles alternate between north and south in the circumferential direction of the rotor 14. The number of the magnetic poles is set according to the design specification of the electric rotating machine 1. In the present embodiment, the number of the magnetic poles is set to be equal to, for example, eight (i.e., four north poles and four south poles).

Referring now to FIGS. 2-7, the stator 20 includes a hollow cylindrical stator core 30, a three-phase stator coil 40, and an outer cylinder 37. In addition, the stator 20 may further have insulating paper interposed between the stator core 30 and the stator coil 40.

Figure 4:
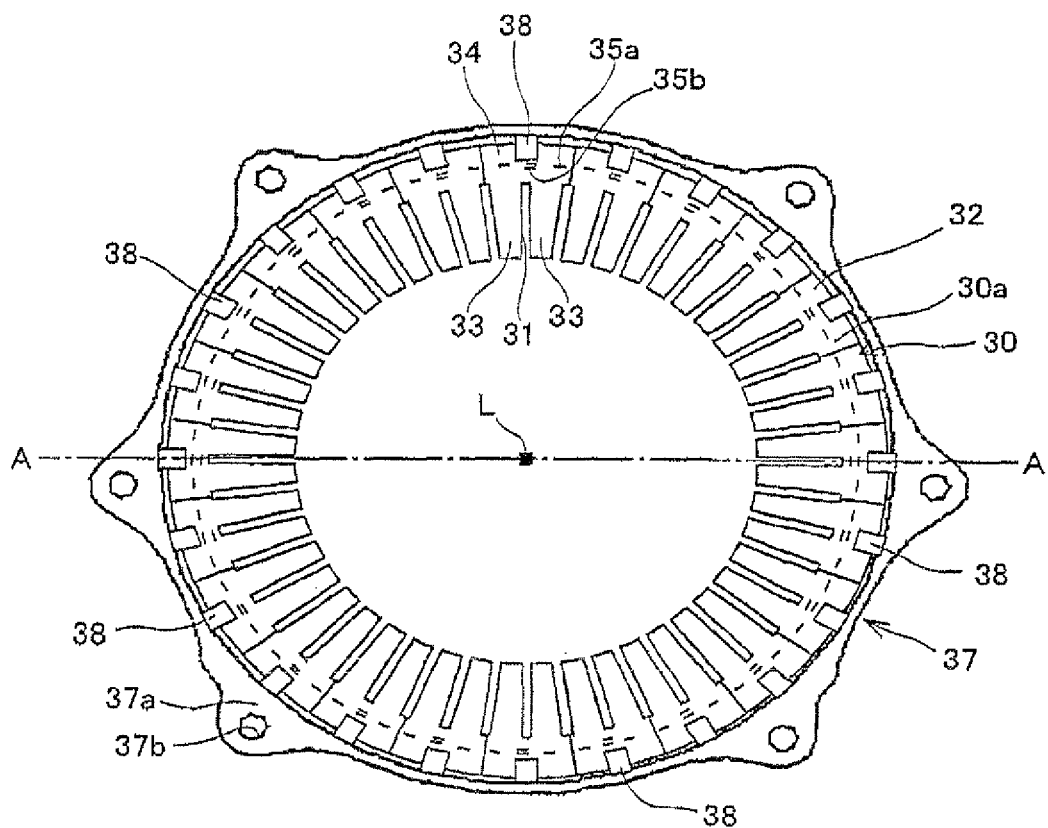
FIG. 4 is an axial end view of the stator omitting the stator coil.

The stator core 30 has, as shown in FIG. 4, a plurality of slots 31 that are formed in the radially inner surface of the stator core 30 and spaced in the circumferential direction of the stator core 30 at predetermined intervals. For each of the slots 31, the depth direction of the slot 31 is coincident with a radial direction of the stator core 30. In the present embodiment, there are provided two slots 31 per magnetic pole of the rotor 14 that has the eight magnetic poles and per phase of the three-phase stator coil 40. Accordingly, the total number of the slots 31 formed in the stator core 30 is equal to 48 (i.e., 2×8×3).

Moreover, in the present embodiment, the stator core 30 is comprised of, for example, 24 stator core segments 32. The stator core segments 32 are arranged in the circumferential direction of the stator core 30 so as to adjoin one another in the circumferential direction.

Figure 3:
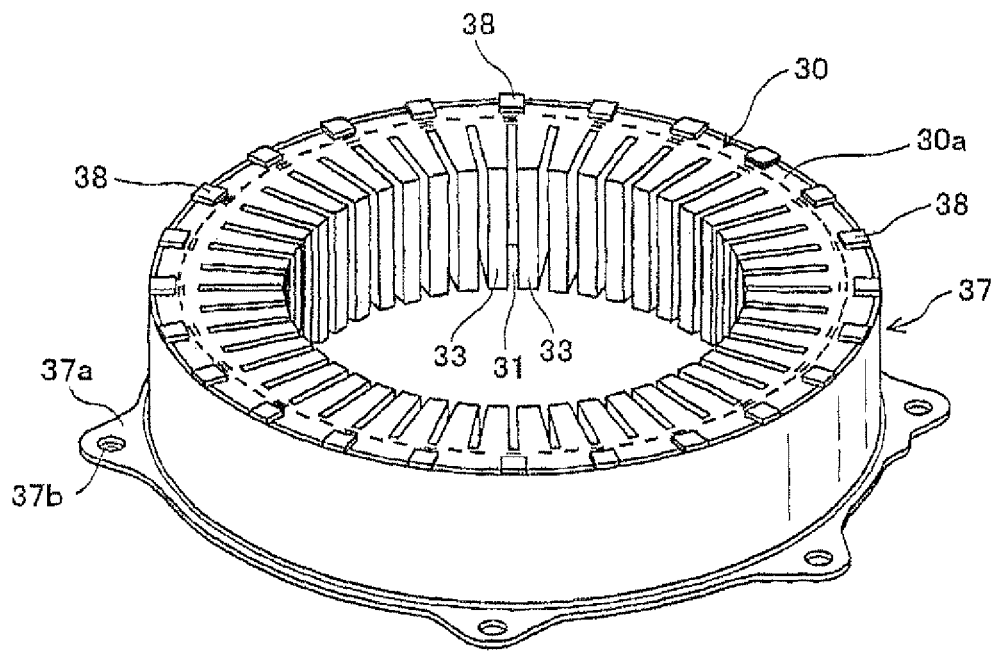
FIG. 3 is a perspective view of the stator omitting a stator coil of the stator.

As shown in FIGS. 3 and 4, each of the stator core segments 32 defines therein one of the slots 31. Moreover, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is positioned radially outside of the tooth portions 33 to connect them. In addition, all the back core portions 34 of the stator core segments 32 together make up a back core portion 34 of the stator core 30.

In the present embodiment, each of the stator core segments 32 is formed by laminating a plurality of magnetic steel sheets in the axial direction of the stator core 30. The magnetic steel sheets are fixed together by, for example, staking.

More specifically, in the present embodiment, each of the magnetic steel sheets has, for example, three radially-outer staking portions 35a and one radially-inner staking portion 35b. The radially-outer staking portions 35a are radially positioned so as to be substantially equidistant from the radially inner and outer ends of the back core portion 34 of the stator core segment 32. Further, the radially-outer staking portions 35a are spaced in the circumferential direction of the stator core 30 at predetermined intervals, so that the center one of the radially-outer staking portions 35a is substantially radially aligned with the slot 31 formed in the stator core segment 32. On the other hand, the radially-inner staking portion 35b is positioned radially inside of the radially-outer staking portions 35a and substantially radially aligned with the center one of the radially-outer staking portions 35a. Moreover, each of the radially-outer and radially-inner staking portions 35a and 35b includes a recess formed in one of the major surfaces of the magnetic steel sheet and a protrusion formed on the other major surface. In the staking process, for each adjoining pair of the magnetic steel sheets, the protrusions of the staking portions 35a and 35b of one of the magnetic steel sheets are respectively press-fitted into the recesses of the staking portions 35a and 35b of the other magnetic steel sheet. In addition, the radially-outer staking portions 35a of the magnetic steel sheets together make up three radially-outer staking portions 35a of the stator core segment 32; the radially-inner staking portions 35b of the magnetic steel sheets together make up a radially-inner staking portion 35b of the stator core segment 32.

The outer cylinder 37 is fitted on the radially outer surfaces of the stator core segments 32 to keep the hollow cylindrical shape of the stator core 30. In addition, all the radially outer surfaces of the stator core segments 32 together make up the radially outer surface of the stator core 30.

In the present embodiment, the outer cylinder 37 has an inner diameter that is set to be slightly greater than an outer diameter of the stator core 30. Consequently, no fastening force is exerted by the outer cylinder 37 to the stator core segments 32; thus, no circumferential compressive stress is induced in the stator core segments 32. As a result, the magnetic characteristics of the stator core 30 are prevented from being deteriorated by circumferential compressive stress which otherwise may be induced in the stator core segments 32.

Further, in the present embodiment, the inner diameters of the outer cylinder 37 at the axial ends of the outer cylinder 37 are set to be slightly greater than the inner diameter of the outer cylinder 37 at the axial center of the outer cylinder 37. Consequently, the stator core segments 32 can be easily axially inserted into the outer cylinder 37 without employing a high-accuracy assembling device. As a result, it is possible to suppress increase in the manufacturing cost of the stator 20.

Figure 5:
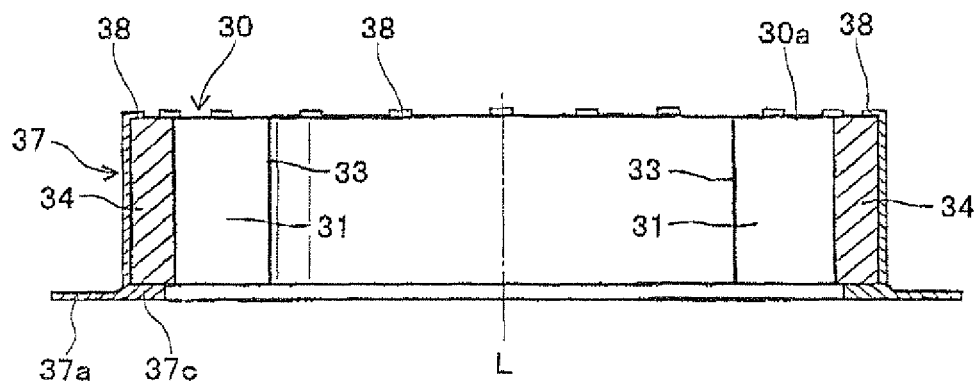
FIG. 5 is a cross-sectional view taken along the line A-A in FIG. 4.

As shown in FIGS. 3-5, at one axial end of the outer cylinder 37, there is formed a substantially annular flange portion 37a that protrudes radially outward from the radially outer surface of the outer cylinder 37. Further, in the flange portion 37a, there are formed a plurality (e.g., six) of through-holes 37b. The through-holes 37b are arranged in the circumferential direction of the outer cylinder 37 at predetermined intervals, so as to allow a plurality of fixing bolts (not shown) to respectively pass through them.

Furthermore, at the one axial end (i.e., the lower end in FIG. 5) of the outer cylinder 37, there is also formed an annular seat portion 37c that protrudes radially inward from the radially inner surface of the outer cylinder 37. The stator core segments 32, which are received in the outer cylinder 37, rest on the seat portion 37c of the outer cylinder 37.

At the other axial end (i.e., the upper end in FIG. 5) of the outer cylinder 37, there are formed a plurality of restraining portions 38 which each extend radially inward from the radially inner surface of the outer cylinder 37.

Figure 6:
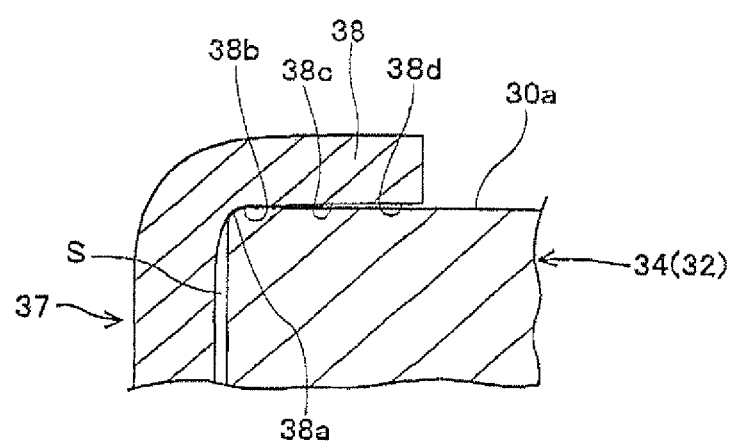
FIG. 6 is an enlarged view of an upper-left corner part of FIG. 5.

Specifically, as shown in FIG. 6, each of the restraining portions 38 is formed by bending an axial end portion of the outer cylinder 37 radially inward at substantially 90°. Further, the bending start point 38a in the bending is located at substantially the same position as a radially outer edge of a corresponding one of the stator core segments 32. Each of the restraining portions 38 extends radially inward from the bending start point 38a and abuts only a radially-outer end part of the back core portion 34 of the corresponding stator core segment 32. More specifically, in the present embodiment, each of the restraining portions 38 includes a proximal part 38b, a central part 38c and a distal part 38d, among which only the proximal part 38b abuts the back core portion 34 of the corresponding stator core segment 32 for a predetermined radial distance from the radially outer edge of the corresponding stator core segment 32. In addition, between the radially inner surface of the outer cylinder 37 and the radially outer surface of the stator core 30, there is provided a clearance S. In other words, the fit between the radially inner surface of the outer cylinder 37 and the radially outer surface of the stator core 30 is a clearance fit.

Moreover, in the present embodiment, as shown in FIG. 4, the number of the restraining portions 38 of the outer cylinder 37 is set to be equal to the number of the stator core segments 32. The restraining portions 38 of the outer cylinder 37 are equally spaced in the circumferential direction of the stator core 30 so that each of the restraining portions 38 is substantially equidistant from the circumferential ends of the corresponding stator core segment 32. Consequently, each of the stator core segments 32, which are received in the outer cylinder 37, is axially fixed between the seat portion 37c and the corresponding restraining portion 38 of the outer cylinder 37. As a result, each of the stator core segments 32 is prevented from axially moving out of the outer cylinder 37. In addition, all the restraining portions 38 of the outer cylinder 37 together make up a restraint (or restraining member) for restraining axial movement of the stator core segments 32.

Furthermore, for each of the restraining portions 38 of the outer cylinder 37, there are interposed, between the restraining portion 38 and the central axis L of the outer cylinder 37, the center one of the radially-outer staking portions 35a and the radially-inner staking portion 35b of the corresponding stator core segment 32. In other words, the restraining portion 38 is radially aligned with both the center one of the radially-outer staking portions 35a and the radially-inner staking portion 35b of the corresponding stator core segment 32. Consequently, when the restraining portion 38 is brought into contact with the radially-outer end part of the back core portion 34 of the corresponding stator core segment 32 during the formation of the restraining portion 38 by bending, the magnetic steel sheets forming the corresponding stator core segment 32 can be reliably prevented from being separated from each other at the radially inner end of the corresponding stator core segment 32.

Figure 7:
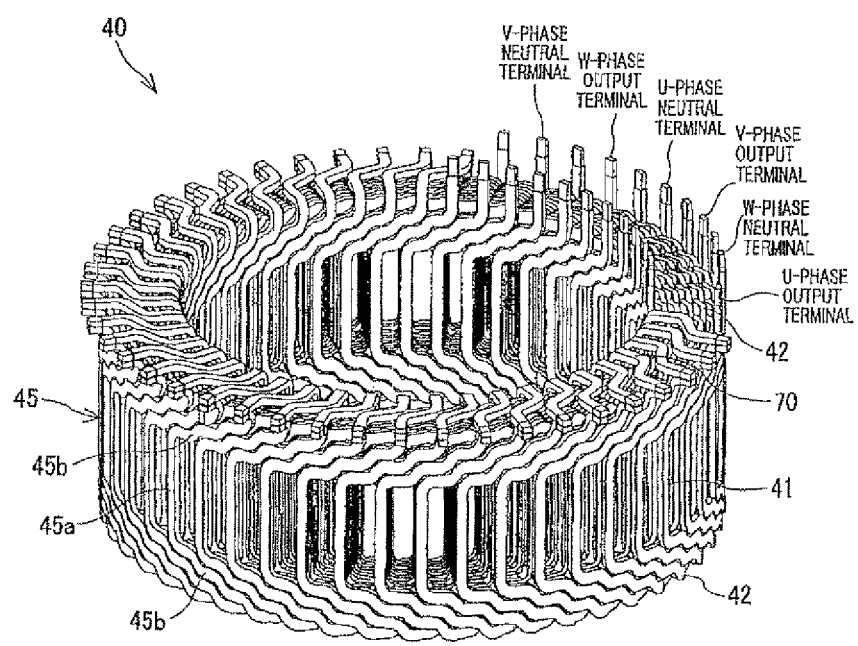
FIG. 7 is a perspective view of the stator coil of the stator.

The stator coil 40 is formed of a plurality (e.g., 12 in the present embodiment) of wave-shaped electric wires 45. As shown in FIG. 7, the stator coil 40 has, as a whole, a hollow cylindrical shape. Further, after being mounted to the stator core 30, the stator coil 40 has a straight part 41 received in the slots 31 of the stator core 30 and a pair of coil end parts 42 that are respectively formed on opposite axial sides of the straight part 41 and both located outside of the slots 31. In addition, on one axial side of the straight part 41, U-phase, V-phase and W-phase output terminals and U-phase, V-phase and W-phase neutral terminals of the stator coil 40 protrude from the annular axial end face of the coil end part 42; a plurality of crossover parts 70 of the electric wires 45 cross over the axial end face from the radially inner side to the radially outer side of the axial end face to connect corresponding pairs of the electric wires 45.

In the present embodiment, the stator coil 40 is formed by first stacking the electric wires 45 to form a flat band-shaped electric wire assembly and then rolling the flat band-shaped electric wire assembly by, for example, six turns into the hollow cylindrical shape.

Moreover, in the present embodiment, each of the electric wires 45 is configured with an electric conductor having a substantially rectangular cross section and an insulating coat that covers the outer surface of the electric conductor. Further, after being mounted to the stator core 30, each of the electric wires 45 includes a plurality of in-slot portions 45a and a plurality of turn portions 45b. Each of the in-slot portions 45a is received in a corresponding one of the slots 31 of the stator core 30. Each of the turn portions 45b is located outside of the slots 31 of the stator core 30 and connects a corresponding adjacent pair of the in-slot portions 45a.

Next, a method of manufacturing the stator 20 according to the present embodiment will be described with reference to FIG. 8.

As shown in FIG. 8, the method according to the present embodiment includes a preparing step 101, an assembling step 102, a fitting step 103, and a bending step 104.

In the preparing step 101, the stator core segments 32 (i.e., the stator core 30), the hollow cylindrical stator coil 40, and an outer cylinder 37A are prepared.

Figure 10:
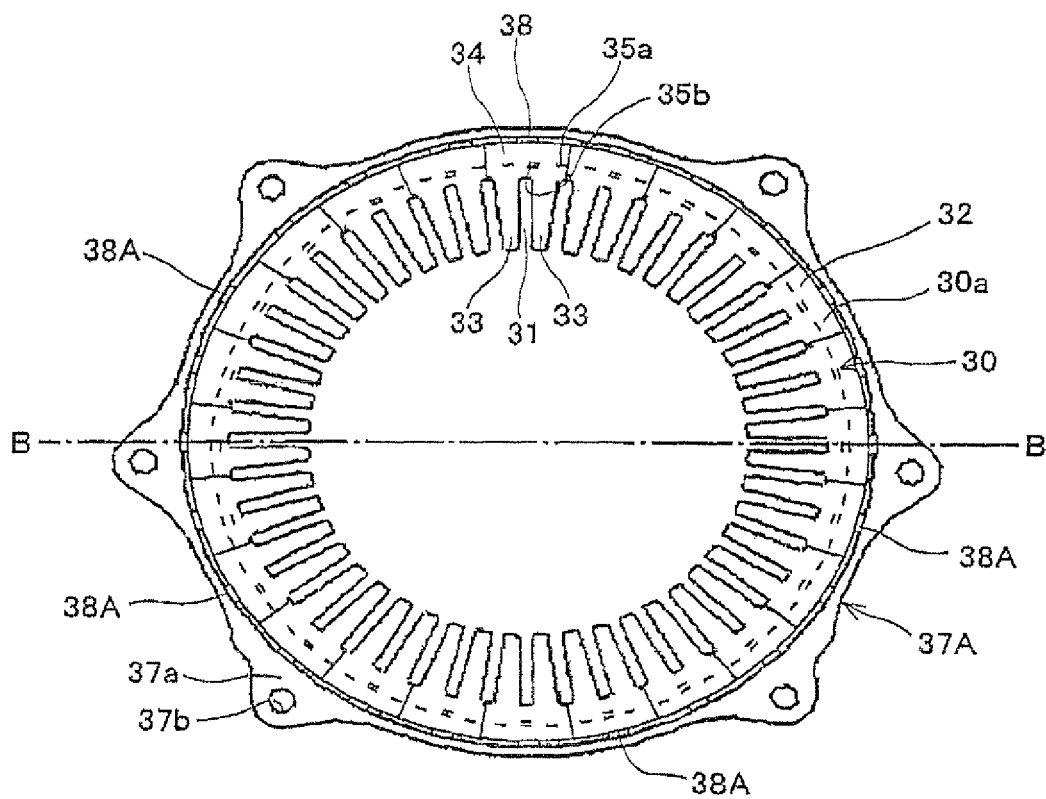
FIG. 10 is an axial end view illustrating the fitting step of the method, wherein the stator coil is omitted and the outer cylinder is fitted on the radially outer surface of the stator core.
Figure 11:
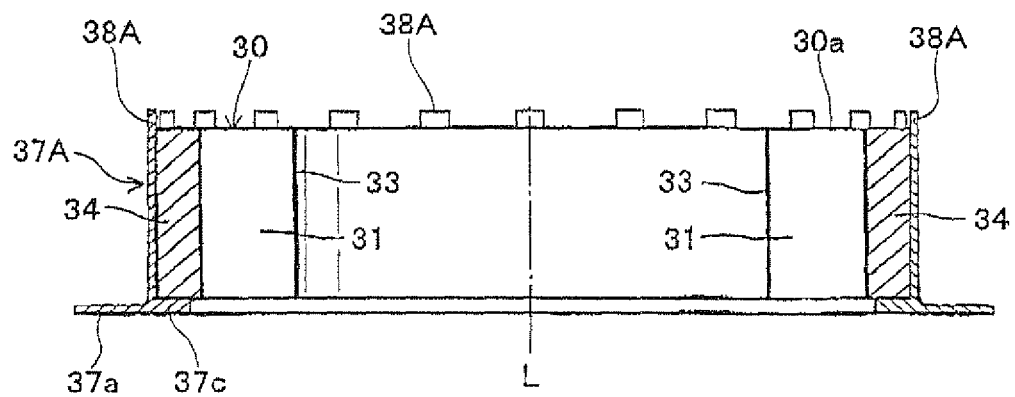
FIG. 11 is a cross-sectional view taken along the line B-B in FIG. 10.

The outer cylinder 37A make up the outer cylinder 37 after the bending step 104. Specifically, as shown in FIGS. 9-11, at one axial end (i.e., the lower end in FIG. 11) of the outer cylinder 37A, there are formed both a flange portion 37a and a seat portion 37c that respectively make up the flange portion 37a and seat portion 37c of the outer cylinder 37. At the other axial end (i.e., the upper end in FIG. 11) of the outer cylinder 37A, there are formed a plurality of protrusions 38A that respectively make up the restraining portions 38 of the outer cylinder 37 after the bending step 104. The protrusions 38A each protrude axially outward and together make up a segmented axial end portion of the outer cylinder 37A. In other words, the outer cylinder 37A has, at the other axial end thereof, an axial end portion that is circumferentially segmented into the protrusions 38A.

In the assembling step 102, the stator core 30 is assembled to the stator coil 40 as shown in FIG. 7.

Specifically, in this step, the tooth portions 33 of the stator core segments 32 are respectively inserted into the spaces formed between stacks of the in-slot portions 45a of the electric wires 45 from the radially outside of the stator coil 40; each of the stacks includes twelve radially-aligned in-slot portions 45a of the electric wires 45.

Consequently, after the assembling step 102, the in-slot portions 45a of the electric wires 45 are respectively received in the corresponding slots 31 of the stator core 30. More specifically, for each of the electric wires 45, each adjacent pair of the in-slot portions 45a are respectively received in a corresponding pair of the slots 31 which are separated from each other by a predetermined number (e.g., six in the present embodiment) of the slots 51. Moreover, each of the turn portions 45b, which connects the corresponding adjacent pair of the in-slot portions 45a, protrudes from a corresponding axial end face of the stator core 30. In addition, all the in-slot portions 45a of the electric wires 45 together make up the straight part 41 of the stator coil 40; all of those turn portions 45b of the electric wires 45 which protrude outside of the slots 31 on one axial side of the stator core 30 together make up the coil end part 42 of the stator coil 40 on the one axial side; all of those turn portions 45b of the electric wires 45 which protrude outside of the slots 31 on the other axial side of the stator core 30 together make up the coil end part 42 on the other axial side.

In the fitting step 103, the outer cylinder 37A is fitted onto the radially outer surface of the stator core 30.

Specifically, in this step, the outer cylinder 37A is fitted, from the other axial end thereof (i.e., the opposite end to the seat portion 37c), onto the assembly of the stator core 30 and the stator coil 40. Consequently, as shown in FIG. 11, the stator core 30 is received in the outer cylinder 37A so as to rest on the seat portion 37c of the outer cylinder 37. Moreover, the protrusions 38A of the outer cylinder 37A axially protrudes from the axial end face 30a of the stator core 30 on the opposite side to the seat portion 37c. In addition, in the present embodiment, the fit between the radially inner surface of the outer cylinder 37A and the radially outer surface of the stator core 30 is a clearance fit.

In the bending step 104, each of the protrusions 38A of the outer cylinder 37A is bent radially inward to make contact with the axial end face 30a of the stator core 30. In the present embodiment, this step is performed by using a 90°-bending press machine.

Figure 12:
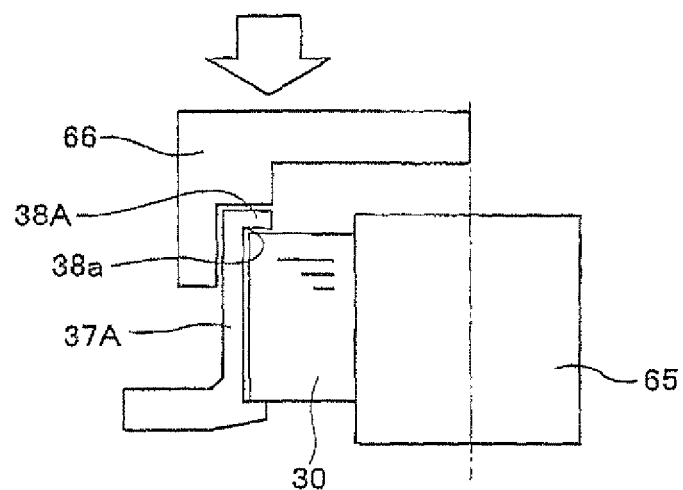
FIG. 12 is a schematic view illustrating a bending step of the method.

Specifically, as shown in FIG. 12, the stator core 30 is first held by a core bar 65 of the press machine so that the protrusions 38A of the outer cylinder 37A protrudes upward from the stator core 30. Then, a punch 66 of the press machine is moved downward to press and thereby bend one of the protrusions 38A radially inward at substantially 90°, with the bending start point 38a located at substantially the same position as the radially outer edge of the corresponding stator core segment 32. Consequently, the bent protrusion 38A makes up one of the restraining portions 38 of the outer cylinder 37. In addition, referring again to FIG. 6, among the proximal part 38b, the central part 38c and the distal part 38d of the obtained restraining portion 38, only the proximal part 38b is brought into abutment with the radially-outer end part of the back core portion 34 of the corresponding stator core segment 32.

Further, the above process is repeated for all the other protrusions 38A of the outer cylinder 37A. Consequently, the outer cylinder 37A that has the protrusions 38A is altered into the outer cylinder 37 that has the restraining portions 38.

As a result, the stator 20 according to the present embodiment is obtained.

According to the present embodiment, it is possible to achieve the following advantages.

In the present embodiment, the stator 20 includes the hollow cylindrical stator core 30, the stator coil 40 mounted on the stator core 30, the outer cylinder 37, and the restraint. The stator core 30 is comprised of the stator core segments 32 that are arranged in the circumferential direction of the stator core 30 to adjoin one another in the circumferential direction. The outer cylinder 37 is fitted on the radially outer surfaces of the stator core segments 32 with the clearance S provided between the radially outer surfaces of the stator core segments 32 and the radially inner surface of the outer cylinder 37. The restraint, which is comprised of the restraining portions 38 of the outer cylinder 37 in the present embodiment, is provided at the other axial end of the outer cylinder 37 to restrain axial movement of the stator core segments 32. Moreover, each of the stator core segments 32 has the tooth portions 33 that radially extend and the back core portion 34 that is positioned radially outside of the tooth portions 33 to connect the tooth portions 33. The restraint is formed by bending an axial end portion of the outer cylinder 37 radially inward and abuts only the radially-outer end parts of the back core portions 34 of the stator core segments 32. Here, the axial end portion that is bent to form the restraint is comprised of the protrusions 38A that are bent to form the restraining portions 38.

In operation of the electric rotating machine 1, the amount of magnetic flux flowing through the radially-outer end parts of the back core portions 34 of is the stator core segments 32 is less than those flowing through other parts of the back core portions 34 and those flowing through the tooth portions 33 of the stator core segments 32. Therefore, with the above restraint according to the present embodiment, it is possible to reliably restrain axial movement of the stator core segments 32 while effectively suppressing the increase in iron loss of the stator 20 due to the abutment between the restraint and the stator core 30.

In the present embodiment, the restraint is comprised of the restraining portions 38 of the outer cylinder 37 that are separated from one another in the circumferential direction of the stator core 30.

Consequently, in comparison with a case where the restraint is made up of an annular portion of the outer cylinder 37 which continuously extends over the entire circumference of the outer cylinder 37, it is possible to reduce the contact area between the restraint and the stator core 30, thereby more effectively suppressing the increase in iron loss of the stator 20 due to the abutment between the restraint and the stator core 30. Moreover, it is also possible to reduce the pressing load required for the formation of the restraint, thereby reducing the size and thus the cost of the press machine.

Further, in the present embodiment, the restraining portions 38 of the outer cylinder 37 are arranged in the circumferential direction of the stator core 30 so that each of the restraining portions 38 abuts the radially-outer end part of the back core portion 34 of a corresponding one of the stator core segments 32.

With the above arrangement, each of the stator core segments 32, which are received in the outer cylinder 37, is axially fixed between the seat portion 37c and the corresponding restraining portion 38 of the outer cylinder 37. Consequently, even when there is variation in the axial lengths of the stator core segments 32 and/or external vibration is transmitted to the stator 20, it is still possible to reliably restrain axial movement of each of the stator core segments 32. As a result, it is possible to reliably prevent the insulating coats of the electric wires 45 that form the stator coil 40 from being hit and thereby damaged by the stator core segments 32.

In the present embodiment, each of the restraining portions 38 includes the proximal part 38b, the central part 38c and the distal part 38d, among which only the proximal part 38b abuts the radially-outer end part of the back core portion 34 of the corresponding stator core segment 32.

With the above arrangement, it is possible to minimize the contact area between the restraint (i.e., the restraining portions 38) and the stator core 30, thereby minimizing the increase in iron loss of the stator 20 due to the abutment between the restraint and the stator core 30.

In the present embodiment, the method of manufacturing the stator 20 includes the preparing step 101, the assembling step 102, the fitting step 103, and the bending step 104. In the preparing step 101, the stator core segments 32, the hollow cylindrical stator coil 40, and the outer cylinder 37A are prepared. In the assembling step 102, the stator core segments 32 are assembled to the stator coil 40 so that the stator core segments 32 together make up the hollow cylindrical stator core 30. In the fitting step 103, the outer cylinder 37A is fitted onto the radially outer surface of the stator core 30 with the clearance S provided between the radially inner surface of the outer cylinder 37A and the radially outer surface of the stator core 30, so that an axial end portion of the outer cylinder 37A axially protrudes from the axial end face 30a of the stator core 30. Here, the axial end portion is comprised of the protrusions 38A of the outer cylinder 37A. In the bending step 104, the axial end portion of the outer cylinder 37A is bent radially inward to abut the axial end face 30a of the stator core 30. Moreover, each of the stator core segments 32 has the tooth portions 33 that radially extend and the back core portion 34 that is positioned radially outside of the tooth portions 33 to connect the tooth portions 33. In the bending step 104, the axial end portion of the outer cylinder 37A is bent radially inward so as to abut only the radially-outer end parts of the back core portions 34 of the stator core segments 32. Consequently, the outer cylinder 37A is altered into the outer cylinder 37 which includes the restraint that restrains axial movement of the stator core segments 32.

With the above method, it is possible to easily manufacture the stator 20 according to the present embodiment.

Modifications to First Embodiment

In the previous embodiment, there is provided one restraining portion 38 of the outer cylinder 37 per stator core segment 32. However, it is also possible to provide a plurality of restraining portions 38 per stator core segment 32. Further, it is also possible that part of the stator core segments 32 each have only one restraining portion 38 provided thereto, while the other stator core segments 32 each have a plurality of restraining portions 38 provided thereto.

In the previous embodiment, the restraining portions 38 of the outer cylinder 37, which are separated from one another in the circumferential direction of the stator core 30, together make up the restraint for restraining axial movement of the stator core segments 32. However, the restraint may also be made up of an annular portion of the outer cylinder 37 which continuously extends over the entire circumference of the outer cylinder 37.

In the previous embodiment, each of the restraining portions 38 includes the proximal part 38b, the central part 38c and the distal part 38d, among which only the proximal part 38b abuts the radially-outer end part of the back core portion 34 of the corresponding stator core segment 32.

Figure 13:
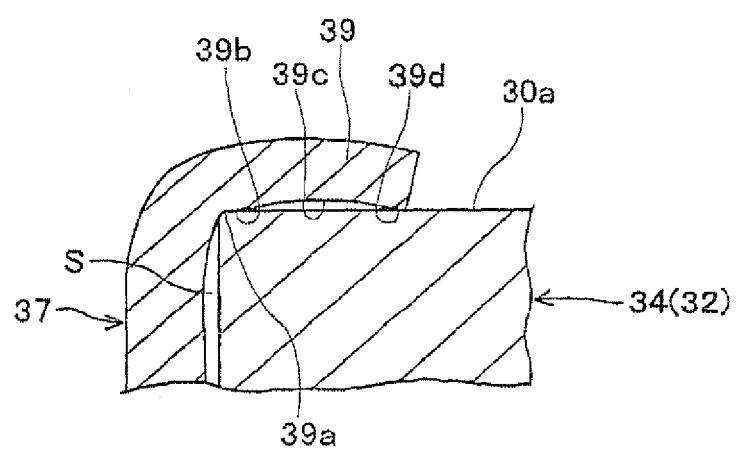
FIG. 13 is an enlarged cross-sectional view of part of a stator according to a modification of the first embodiment.

However, as shown in FIG. 13, the outer cylinder 37 may also have a plurality of restraining portions 39 instead of the restraining portions 38. Each of the restraining portions 39 includes a proximal part 39b, a central part 39c and a distal part 39d. Both the proximal part 39b and the distal part 39d abut the radially-outer end part of the back core portion 34 of the corresponding stator core segment 32, while the central part 39c is spaced from the radially-outer end part of the back core portion 34.

With the above configuration, each of the restraining portions 39 abuts the radially-outer end part of the back core portion 34 of the corresponding stator core segment 32 at two spots. Consequently, during the formation of the restraining portion 39, the magnetic steel sheets that form the corresponding stator core segment 32 can be more reliably prevented from being separated from each other at the radially inner end of the corresponding stator core segment 32. In other words, the corresponding stator core segment 32 can be more reliably prevented from being spread at the radially inner end thereof. As a result, the corresponding stator core segment 32 can be more reliably prevented from making contact with the stator coil 40, thereby securing a sufficient insulation distance therebetween.

Second Embodiment

This embodiment illustrates a stator 20 which has a similar structure to the stator 20 according to the first embodiment; accordingly, only the differences therebetween will be described hereinafter.

Figure 14:
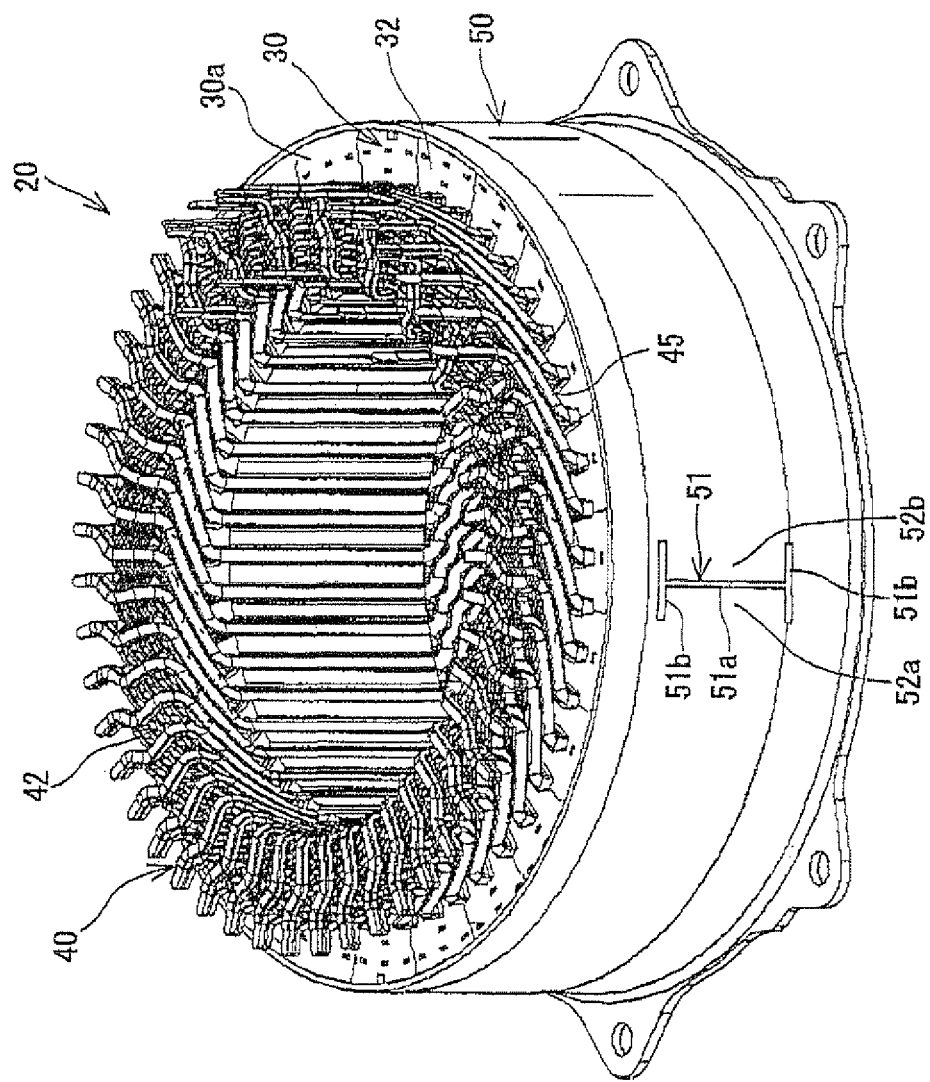
FIG. 14 is a perspective view of a stator according to a second embodiment.
Figure 15:
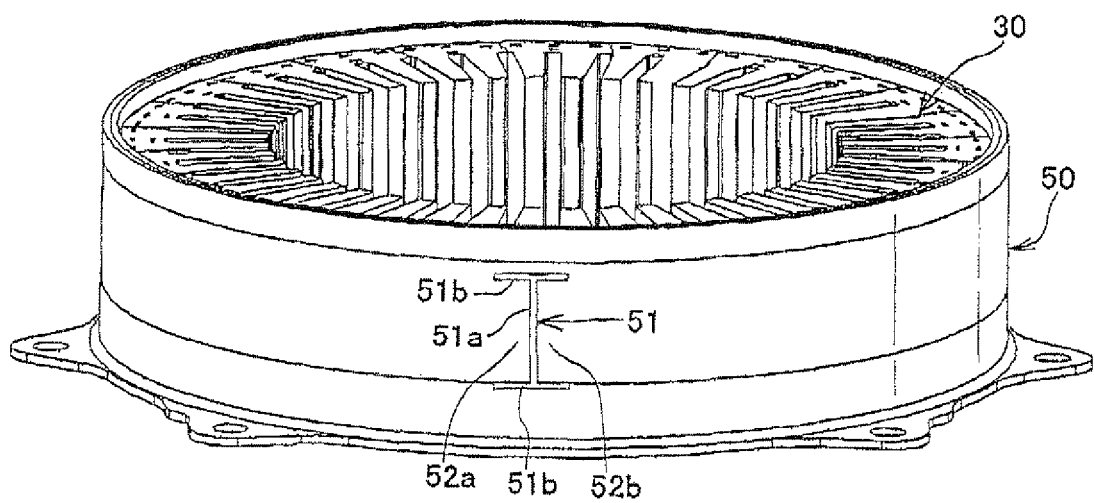
FIG. 15 is a perspective view of the stator according to the second embodiment omitting a stator coil of the stator.
Figure 16:
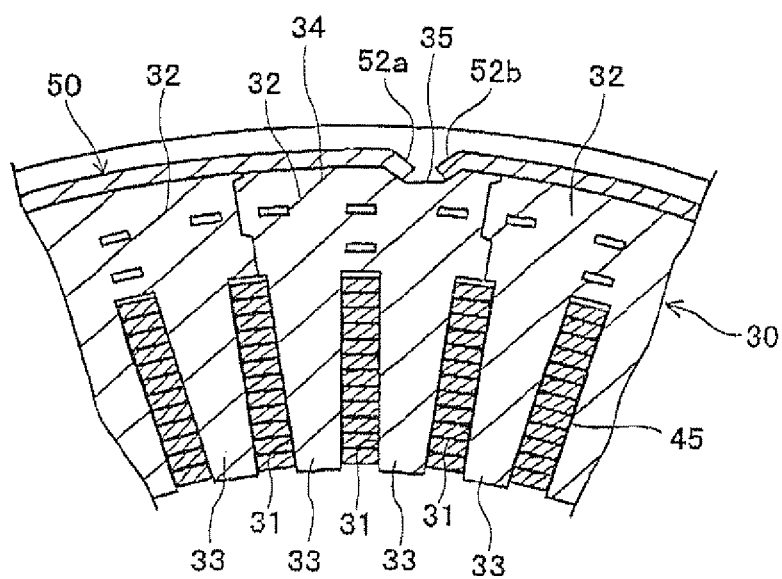
FIG. 16 is an enlarged cross-sectional view of part of the stator according to the second embodiment.

As shown in FIGS. 14-16, in the present embodiment, the stator 20 includes an outer cylinder 50 instead of the outer cylinder 37 in the first embodiment.

The outer cylinder 50 is fitted on the radially outer surfaces of the stator core segments 32 so as to fasten the stator core segments 32 together and thereby keep the hollow cylindrical shape of the stator core 30. In addition, all the radially outer surfaces of the stator core segments 32 together make up the radially outer surface of the stator core 30.

Specifically, in the present embodiment, the outer cylinder 50 has a first slit 51a and a pair of second slits 51b formed at one spot thereof. The first slit 51a extends in the axial direction of the outer cylinder 50 and radially penetrates the outer cylinder 50 to connect the radially outer and inner surfaces of the outer cylinder 50. On the other hand, each of the second slits 51b extends in the circumferential direction of the outer cylinder 50 and also radially penetrates the outer cylinder 50 to connect the radially outer and inner surfaces of the outer cylinder 50. The second slits 51b are axially spaced from each other by the axial length of the first slit 51a. The first slit 51a connects the circumferential centers of the second slits 51b so that the first and second slits 51a and 51b together make up a slit 51 that is substantially in the shape of English capital letter "1". Further, the outer cylinder 50 also has a pair of engaging portions 52a and 52b that are respectively formed on opposite circumferential sides of the first slit 51a and adjoin the first slit 51a and corresponding halves of the second slits 51b. In other words, each of the engaging portions 52a and 52b is confined by the first slit 51a and the corresponding halves of the second slits 51b on three sides thereof.

Moreover, in the present embodiment, the stator core 30 has a recess 35 that is formed in the radially outer surface of one of the stator core segments 32. The recess 35 is in the form of a groove that extends in the axial direction of the stator core 30 with a predetermined circumferential width. The longitudinal ends of the recess 35 are respectively close to the axial ends of the stator core 30. Each of the circumferential side walls of the recess 35 extends obliquely with respect to the bottom wall of the recess 35, so that the distance between the circumferential side walls decrease in the radially inward direction. Here, the circumferential side walls of the recess 35 denote the pair of interior walls of the stator core segment 32 which face each other in the circumferential direction of the stator core 30 with the recess 35 formed therebetween; the bottom wall of the recess 35 denotes that interior wall of the stator core segment 32 which faces radially outward and is positioned furthest from the radially outer surface of the stator core segment 32. That is, in the present embodiment, the recess 35 has a cross section that is perpendicular to the axial direction of the stator core 30 and tapers radially inward. In addition, as shown in FIG. 16, the recess 35 is positioned in the circumferential direction of the stator core 30 so as to be radially aligned with one of the tooth portions 33 of the stator core segment 32.

Furthermore, in the present embodiment, the engaging portions 52a and 52b of the outer cylinder 50 are plastically deformed radially inward into the recess 35 of the stator core 30 so as to respectively abut and thereby engage with corresponding side walls of the recess 35 which face the engaging portions 52a and 52b. Consequently, with the engagement between the engaging portions 52a and 52b and the corresponding side walls of the recess 35, the outer cylinder 50 and the stator core 30 are fastened together.

More specifically, the radially inner surface of the engaging portion 52a is brought into contact with one (i.e., the left one in FIG. 16) of the circumferential side walls of the recess 35, while the radially inner surface of the engaging portion 52b is brought into contact with the other circumferential side wall of the recess 35. Consequently, the outer cylinder 50 and the stator core 30 are circumferentially fixed together so that they cannot rotate relative to each other. In other words, the outer cylinder 50 is prevented from moving relative to the stator core 30 in either of opposite circumferential directions of the stator core 30 (or in either the clockwise or the counterclockwise direction).

Moreover, the axial end faces of the engaging portion 52a are respectively brought into contact with the left halves of the axial side walls of the recess 35, while the axial end faces of the engaging portion 52b are respectively brought into contact with the right halves of the axial side walls of the recess 35. Here, the axial side walls of the recess 35 denote the pair of interior walls of the stator core segment 32 which face each other in the axial direction of the stator core 30 with the recess 35 formed therebetween. Consequently, the outer cylinder 50 and the stator core 30 are axially fixed together. In other words, the outer cylinder 50 and the stator core 30 are prevented from moving relative to each other in the axial direction of the stator core 30.

Furthermore, in the present embodiment, both the engaging portions 52a and 52b of the outer cylinder 50 are joined, for example by welding, to the bottom wall of the recess 35 of the stator core 30. Consequently, the outer cylinder 50 and the stator core 30 can be more reliably prevented from moving relative to each other in any of the circumferential, axial and radial directions of the stator core 30.

Next, a method of manufacturing the stator 20 according to the present embodiment will be described with reference to FIG. 17.

As shown in FIG. 17, the method according to the present embodiment includes a preparing step 201, an assembling step 202, a fitting step 203, and a fastening step 204.

In the preparing step 201, the stator core segments 32 (i.e., the stator core 30), the hollow cylindrical stator coil 40, and the outer cylinder 50 are prepared.

In addition, one of the stator core segments 32 prepared in this step has the recess 35 formed therein. On the other hand, the outer cylinder 50 prepared in this step has the slit 51 and the engaging portions 52a and 52b formed therein.

In the assembling step 202, the stator core 30 is assembled to the stator coil 40 as shown in FIG. 7.

Specifically, in this step, the tooth portions 33 of the stator core segments 32 are respectively inserted into the spaces formed between stacks of the in-slot portions 45a of the electric wires 45 from the radially outside of the stator coil 40; each of the stacks includes twelve radially-aligned in-slot portions 45a of the electric wires 45.

Consequently, the stator core segments 32 are placed together to make up the hollow cylindrical stator core 30. The in-slot portions 45a of the electric wires 45 that form the stator coil 40 are respectively received in the corresponding slots 31 of the stator core 30. On the other hand, the turn portions 45b of the electric wires 45 are located outside of the slots 31 of the stator core 30 and protrude from the corresponding axial end faces 30a of the stator core 30.

In the fitting step 203, the outer cylinder 50 is axially fitted onto the radially outer surface of the stator core 30 so that the engaging portions 52a and 52b of the outer cylinder 50 are brought into alignment with the recess 35 of the stator core 30. More specifically, the first slit 51a of the outer cylinder 50, by which the engaging portions 52a and 52b are demarcated from each other, is positioned at the circumferential center of the recess 35 of the stator core 30.

In the fastening step 204, the outer cylinder 50 and the stator core 30 are fastened together.

Figure 18A:
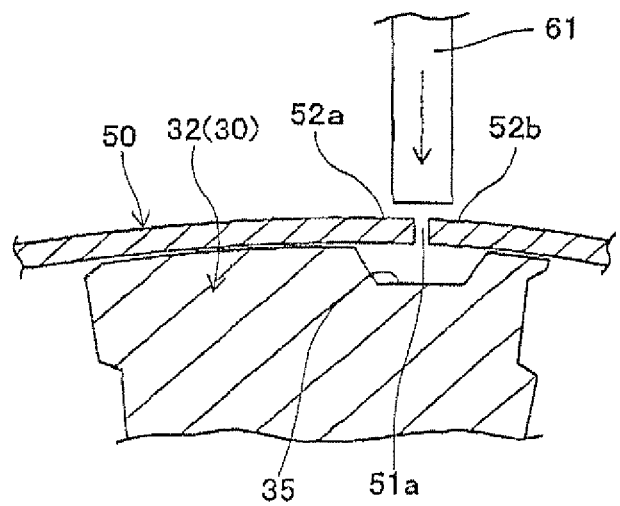
FIGS. 18A and 18B are schematic views illustrating a fastening step of the method according to the second embodiment.
Figure 18B:
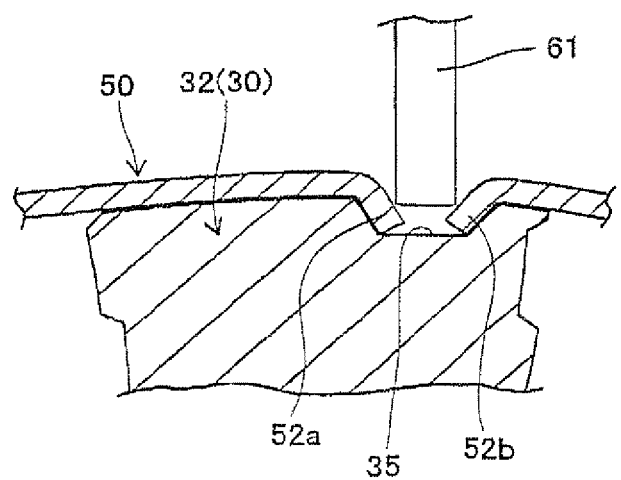

Specifically, in this step, as shown in FIG. 18A, a punch 61 is placed on the radially outside of the first slit 51a of the outer cylinder 50 and pressed against both the engaging portions 52a and 52b of the outer cylinder 50 radially inward. Consequently, as shown in FIG. 18B, both the engaging portions 52a and 52b of the outer cylinder 50 are plastically deformed radially inward into the recess 35 of the stator core 30, so that they are brought into contact with the corresponding side walls of the recess 35 to engage with the corresponding side walls. Then, the punch 61 is removed from the outer cylinder 50 radially outward. Thereafter, both the engaging portions 52a and 52b of the outer cylinder 50 are joined, for example by welding, to the bottom wall of the recess 35 of the stator core 30.

As a result, the stator 20 according to the present embodiment is obtained.

According to the present embodiment, it is possible to achieve the following advantages.

In the present embodiment, the stator 20 includes the hollow cylindrical stator core 30, the stator coil 40, and the outer cylinder 50. The stator core 30 is comprised of the stator core segments 32 that are arranged in the circumferential direction of the stator core 30 to adjoin one another in the circumferential direction. The stator coil 40 is mounted on the stator core 30. The outer cylinder 50 is fitted on the radially outer surfaces of the stator core segments 32 so as to fasten the stator core segments 32 together. The stator core 30 has the recess 35 formed in the radially outer surface of one of the stator core segments 32. The outer cylinder 50 has the slit 51 that radially penetrates the outer cylinder 50 to connect the radially outer and inner surfaces of the outer cylinder 50 and the engaging portions 52a and 52b that adjoin the slit 51. The engaging portions 52a and 52b of the outer cylinder 50 are plastically deformed radially inward into the recess 35 of the stator core 30 so as to abut and thereby engage with the corresponding side walls of the recess 35 which face the engaging portions 52a and 52b.

Consequently, with the engagement between the engaging portions 52a and 52b of the outer cylinder 50 and the corresponding side walls of the recess 35 of the stator core 30, it is possible to prevent relative rotation between the outer cylinder 50 and the stator core 30.

Moreover, since the engaging portions 52a and 52b adjoin the slit 51, it is possible to considerably reduce the pressing load required for plastically deforming the engaging portions 52a and 52b radially inward into the recess 35. For example, the inventors of the present application have confirmed, through an experimental investigation, that the required pressing load according to the present embodiment is reduced to only about ⅓ of that according to Japanese Patent No. 4562093.

In the present embodiment, the slit 51 of the outer cylinder 50 is comprised of the first slit 51a that extends in the axial direction of the stator core 30 and the pair of second slits 51b each of which extends in the circumferential direction of the stator core 30. Further, the first slit 51a intersects the second slits 51b and thereby connects the second slits 51b with each other.

Consequently, with the above formation of the slit 51, it is possible to provide in the outer cylinder 50 more than one engaging portion, more particularly, the two engaging portions 52a and 52b in the present embodiment. As a result, the pressing load required for plastically deforming each individual engaging portion of the outer cylinder 50 can be reduced, thereby more reliably preventing the stator core 30 from being damaged by an excessive pressing load which otherwise may be applied thereto via the engaging portions of the outer cylinder 50. Moreover, with the reduction in the required pressing load, it is also possible to reduce the size and thus the cost of the press machine.

Further, in the present embodiment, the first and second slits 51a and 51b together form the substantially "I" shape of the slit 51.

Consequently, the engaging portions 52a and 52b are respectively confined by the substantially "⊐"-shaped halves of the slit 51, so that they can be respectively brought into contact and thereby engage with the circumferential side walls of the recess 35 of the stator core 30. In other words, for each of the engaging portions 52a and 52b, the side walls of the recess 35, with which the engaging portion engages, include one of the circumferential side walls of the recess 35 which faces the engaging portion in the circumferential direction of the stator core 30.

As a result, with the engagement between the engaging portions 52a and 52b of the outer cylinder 50 and the corresponding circumferential side walls of the recess 35 of the stator core 30, it is possible to prevent the outer cylinder 50 from moving relative to the stator core 30 in either of opposite circumferential directions of the stator core 30 (or in either the clockwise or the counterclockwise direction).

Accordingly, the stator 20 according to the present embodiment is particularly suitable for use in the electric rotating machine 1. As described previously in the first embodiment, the electric rotating machine 1 is configured as a motor-generator; therefore, the direction of torque transmission of the electric rotating machine 1 is frequently shifted between the opposite circumferential directions of the stator core 30.

Furthermore, in the present embodiment, both the engaging portions 52a and 52b of the outer cylinder 50 are joined, for example by welding, to the bottom wall of the recess 35 of the stator core 30. Consequently, the outer cylinder 50 and the stator core 30 can be more reliably prevented from moving relative to each other in any of the circumferential, axial and radial directions of the stator core 30.

In the present embodiment, the method of manufacturing the stator 20 includes the preparing step 201, the assembling step 202, the fitting step 203, and the fastening step 204. In the preparing step 201, the stator core segments 32, the stator coil 40, and the outer cylinder 50 are prepared. In the assembling step 202, the stator core segments 32 are assembled to the stator coil 40 so that the stator core segments 32 together make up the hollow cylindrical stator core 32. In the fitting step 203, the outer cylinder 50 is fitted onto the radially outer surface of the stator core 30. In the fastening step 204, the outer cylinder 50 and the stator core 30 are fastened together. Moreover, in the present embodiment, one of the stator core segments 32 prepared in the preparing step 201 has the recess 35 formed in the radially outer surface thereof, so that the stator core 30, which is made up of the stator core segments 32, also has the recess 35 formed in the radially outer surface thereof. The outer cylinder 50 prepared in the preparing step 201 has the slit 51 that radially penetrates the outer cylinder 50 to connect the radially outer and inner surfaces of the outer cylinder 50 and the engaging portions 52a and 52b that adjoin the slit 51. In the fitting step 203, the outer cylinder 50 is axially fitted onto the radially outer surface of the stator core 30 so that the engaging portions 52a and 52b of the outer cylinder 50 are brought into alignment with the recess 35 of the stator core 30. In the fastening step 204, the engaging portions 52a and 52b of the outer cylinder 50 are plastically deformed radially inward into the recess 35 of the stator core 30 so as to abut and thereby engage with the corresponding side walls of the recess 35 which face the engaging portions 52a and 52b.

With the above method, it is possible to easily manufacture the stator 20 according to the present embodiment. Moreover, since the engaging portions 52a and 52b adjoin the slit 51, it is possible to considerably reduce the pressing load required for plastically deforming the engaging portions 52a and 52b in the fastening step 204.

Third Embodiment

This embodiment illustrates a stator 20 which has a similar structure to the stator 20 according to the second embodiment; accordingly, only the differences therebetween will be described hereinafter.

Figure 19:
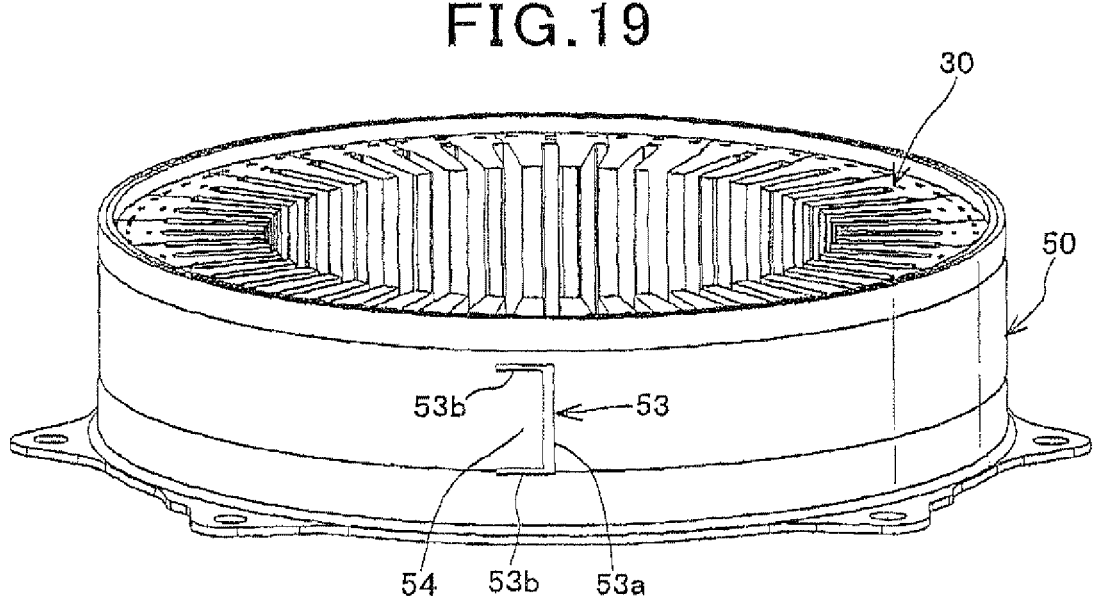
FIG. 19 is a perspective view of a stator according to a third embodiment omitting a stator coil of the stator.
Figure 20:
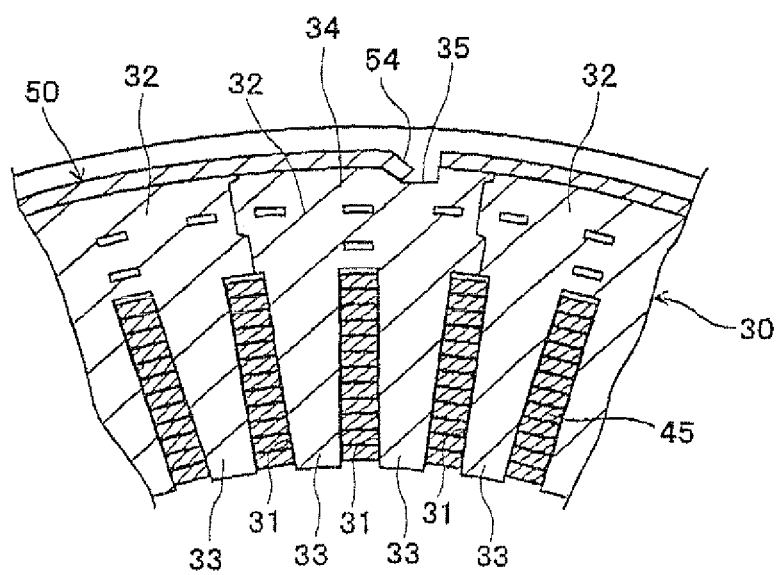
FIG. 20 is an enlarged cross-sectional view of part of the stator according to the third embodiment.

As shown in FIGS. 19 and 20, in the present embodiment, the outer cylinder 50 has a first slit 53a and a pair of second slits 53b formed at one spot thereof. The first slit 53a extends in the axial direction of the outer cylinder 50 and radially penetrates the outer cylinder 50 to connect the radially outer and inner surfaces of the outer cylinder 50. On the other hand, each of the second slits 53b extends in the circumferential direction of the outer cylinder 50 and also radially penetrates the outer cylinder 50 to connect the radially outer and inner surfaces of the outer cylinder 50. The second slits 53b are axially spaced from each other by the axial length of the first slit 53a. The first slit 53a connects the circumferential ends of the second slits 53b on the same side (i.e., the right side in FIG. 19) so that the first and second slits 53a and 53b together make up a substantially "⊐"-shaped slit 53. Further, the outer cylinder 50 also has an engaging portion 54 that is formed on one circumferential side (i.e. the left side in FIG. 19) of the first slit 53a and adjoins all of the first and second slits 53a and 53b. In other words, the engaging portion 54 is confined by the substantially "⊐"-shaped slit 53 on three sides thereof.

Moreover, in the present embodiment, the stator core 30 has a recess 35 that is formed in the radially outer surface of one of the stator core segments 32. The recess 35 is in the form of a groove that extends in the axial direction of the stator core 30 with a predetermined circumferential width. The longitudinal ends of the recess 35 are respectively close to the axial ends of the stator core 30. One (i.e., the left one in FIG. 20) of the circumferential side walls of the recess 35 extends obliquely with respect to the bottom wall of the recess 35, while the other circumferential side wall extends substantially perpendicular to the bottom wall.

Furthermore, in the present embodiment, the engaging portion 54 is plastically deformed radially inward into the recess 35 of the stator core 30 so as to abut and thereby engage with corresponding side walls of the recess 35 which face the engaging portion 54. Consequently, with the engagement between the engaging portion 54 and the corresponding side walls of the recess 35, the outer cylinder 50 and the stator core 30 are fastened together.

More specifically, the radially inner surface of the engaging portion 54 is brought into contact with that one of the circumferential side walls of the recess 35 which extends obliquely with respect to the bottom wall of the recess 35. Consequently, the outer cylinder 50 is prevented from moving relative to the stator core 30 in one of the opposite circumferential directions of the stator core 30 (i.e., the counterclockwise direction in FIG. 20).

Moreover, the axial end faces of the engaging portion 54 are respectively brought into contact with the left halves of the axial side walls of the recess 35. Consequently, the outer cylinder 50 and the stator core 30 are axially fixed together. In other words, the outer cylinder 50 and the stator core 30 are prevented from moving relative to each other in the axial direction of the stator core 30.

Fourth Embodiment

This embodiment illustrates a stator 20 which has a similar structure to the stator 20 according to the second embodiment; accordingly, only the differences therebetween will be described hereinafter.

Figure 21:
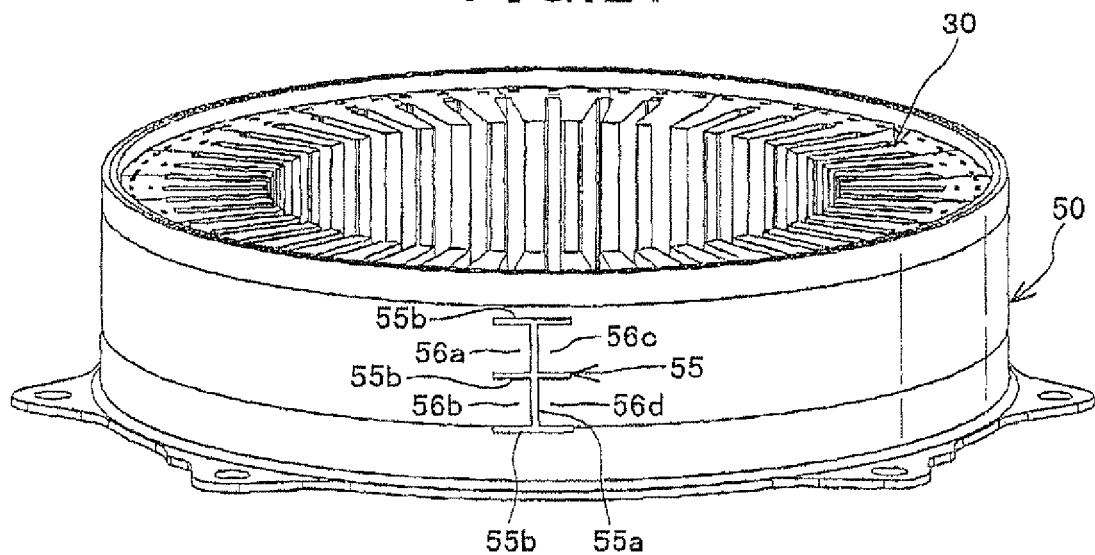
FIG. 21 is a perspective view of a stator according to a fourth embodiment omitting a stator coil of the stator.
Figure 22:
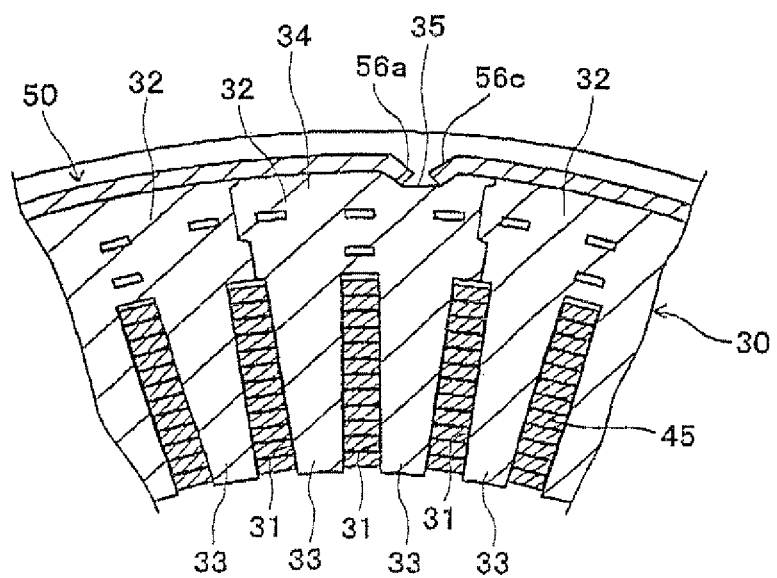
FIG. 22 is an enlarged cross-sectional view of part of the stator according to the fourth embodiment.

As shown in FIGS. 21 and 22, in the present embodiment, the outer cylinder 50 has a first slit 55a and three second slits 55b formed at one spot thereof. The first slit 55a extends in the axial direction of the outer cylinder 50 and radially penetrates the outer cylinder 50 to connect the radially outer and inner surfaces of the outer cylinder 50. On the other hand, each of the second slits 55b extends in the circumferential direction of the outer cylinder 50 and also radially penetrates the outer cylinder 50 to connect the radially outer and inner surfaces of the outer cylinder 50. The second slits 55b are axially spaced from one another at predetermined intervals. The first slit 55a connects the circumferential centers of the three second slit 55b so that the first and second slits 55a and 55b together make up a substantially "王"-shaped slit 55. Further, the outer cylinder 50 also has four engaging portions 56a-56d each of which adjoins corresponding halves of the first and second slits 55a and 55b. In other words, each of the engaging portions 56a-56d is confined by one substantially "⊐"-shaped section of the slit 55 on three sides thereof.

Moreover, in the present embodiment, the stator core 30 has a recess 35 that is identical to the recess 35 of the stator core 30 in the first embodiment. The engaging portions 56a-56d of the outer cylinder 50 are plastically deformed radially inward into the recess 35 of the stator core 30 so as to respectively abut and thereby engage with corresponding side walls of the recess 35 which face the engaging portions 56a-56d. Consequently, with the engagement between the engaging portions 56a-56d and the corresponding side walls of the recess 35, the outer cylinder 50 and the stator core 30 are fastened together.

More specifically, the radially inner surfaces of the engaging portion 56a-56d are brought into contact with the corresponding circumferential side walls of the recess 35. Consequently, the outer cylinder 50 and the stator core 30 are circumferentially fixed together so that they cannot rotate relative to each other. In other words, the outer cylinder 50 is prevented from moving relative to the stator core 30 in either of opposite circumferential directions of the stator core 30 (or in either the clockwise or the counterclockwise direction).

Moreover, axial end faces of the engaging portions 56a-56d are brought into contact with the corresponding axial side walls of the recess 35. Consequently, the outer cylinder 50 and the stator core 30 are axially fixed together. In other words, the outer cylinder 50 and the stator core 30 are prevented from moving relative to each other in the axial direction of the stator core 30.

The stator 20 according to the present embodiment has the same advantages as the stator 20 according to the first embodiment.

In addition, the axial length of each of the engaging portions 56a-56d in the present embodiment is substantially half that of the engaging portions 52a and 52b in the first embodiment. Consequently, compared to the first embodiment, the pressing load required for plastically deforming each individual engaging portion of the outer cylinder 50 can be reduced substantially by half, thereby more reliably preventing the stator core 30 from being damaged by an excessive pressing load which otherwise may be applied thereto via the engaging portions of the outer cylinder 50. Moreover, with the reduction in the required pressing load, it is also possible to further reduce the size and thus the cost of the press machine.

Fifth Embodiment

This embodiment illustrates a stator 20 which has a similar structure to the stator 20 according to the second embodiment; accordingly, only the differences therebetween will be described hereinafter.

Figure 23:
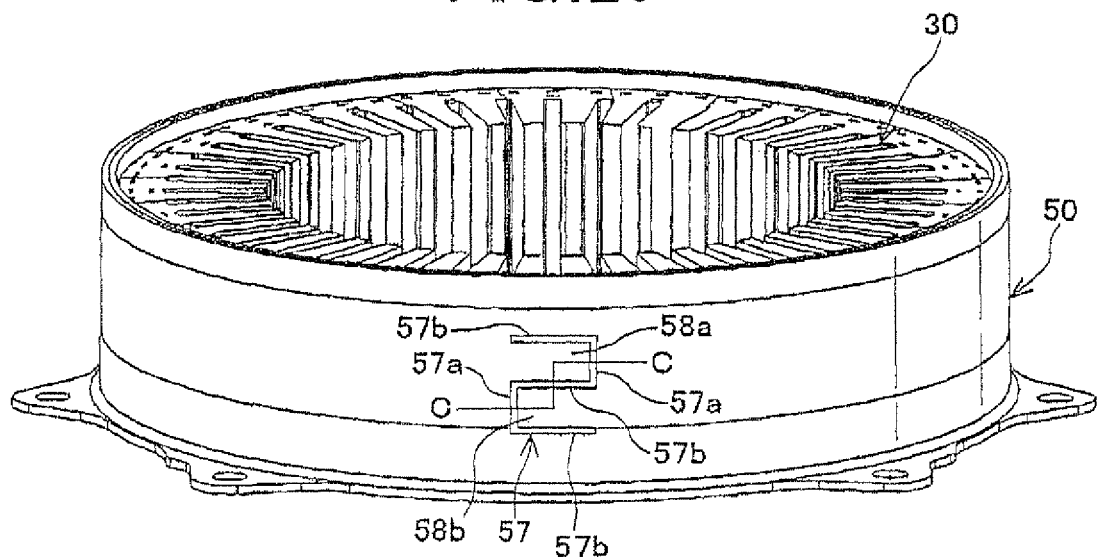
FIG. 23 is a perspective view of a stator according to a fifth embodiment omitting a stator coil of the stator.
Figure 24:
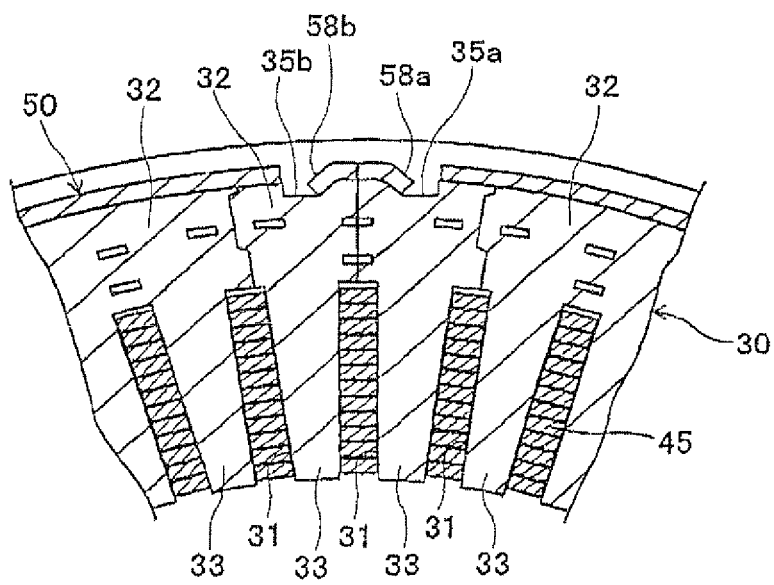
FIG. 24 is a cross-sectional view taken along the line C-C in FIG. 23.

As shown in FIGS. 23 and 24, in the present embodiment, the outer cylinder 50 has two first slits 57a and three second slits 57b formed at one spot thereof. Each of the first slits 57a extends in the axial direction of the outer cylinder 50 and radially penetrates the outer cylinder 50 to connect the radially outer and inner surfaces of the outer cylinder 50. On the other hand, each of the second slits 57b extends in the circumferential direction of the outer cylinder 50 and also radially penetrates the outer cylinder 50 to connect the radially outer and inner surfaces of the outer cylinder 50. Moreover, the first slits 57a are circumferentially spaced from each other by the circumferential length of the second slits 57b. The second slits 57b are spaced from one another by the axial length of the first slits 57a. The first and second slits 57a and 57b are connected to one another so as to together form a substantially reverse "S"-shaped slit 57. Further, the outer cylinder 50 also has two engaging portions 58a and 58b each of which adjoins one corresponding first slit 57a and two corresponding second slits 57b. In other words, each of the engaging portions 58a and 58b is confined by one substantially "⊐"-shaped section of the slit 57 on three sides thereof.

Moreover, in the present embodiment, the stator core 30 has a pair of recesses 35a and 35b that are formed in the radially outer surface of one of the stator core segments 32. Each of the recesses 35a and 35b is in the form of a groove that extends in the axial direction of the stator core 30 with a predetermined circumferential width. The recesses 35a and 35b are circumferentially offset from each other so as to be respectively radially aligned with the two tooth portions 33 of the stator core segment 32. One (i.e., the left one in FIG. 24) of the circumferential side walls of the recess 35a extends obliquely with respect to the bottom wall of the recess 35a, while the other circumferential side wall extends substantially perpendicular to the bottom wall. Similarly, one (i.e., the right one in FIG. 24) of the circumferential side walls of the recess 35b extends obliquely with respect to the bottom wall of the recess 35b, while the other circumferential side wall extends substantially perpendicular to the bottom wall.

Furthermore, in the present embodiment, the engaging portion 58a of the outer cylinder 50 is plastically deformed radially inward into the recess 35a of the stator core 30 so as to abut and thereby engage with corresponding side walls of the recess 35a which face the engaging portion 58a. On the other hand, the engaging portion 58b of the outer cylinder 50 is plastically deformed radially inward into the recess 35b of the stator core 30 so as to abut and thereby engage with corresponding side walls of the recess 35b which face the engaging portion 58b. Consequently, with the engagement between the engaging portions 58a and 58b and the corresponding side walls of the recesses 35a and 35b, the outer cylinder 50 and the stator core 30 are fastened together.

More specifically, the radially inner surface of the engaging portion 58a is brought into contact with the left one of the circumferential side walls of the recess 35a which extends obliquely with respect to the bottom wall of the recess 35a. On the other hand, the radially inner surface of the engaging portion 58b is brought into contact with the right one of the circumferential side walls of the recess 35b which extends obliquely with respect to the bottom wall of the recess 35b. Consequently, the outer cylinder 50 and the stator core 30 are circumferentially fixed together so that they cannot rotate relative to each other. In other words, the outer cylinder 50 is prevented from moving relative to the stator core 30 in either of opposite circumferential directions of the stator core 30 (or in either the clockwise or the counterclockwise direction).

Moreover, the axial end faces of the engaging portion 58a are respectively brought into contact with the axial side walls of the recess 35a. On the other hand, the axial end faces of the engaging portion 58b are respectively brought into contact with the axial side walls of the recess 35b. Consequently, the outer cylinder 50 and the stator core 30 are axially fixed together. In other words, the outer cylinder 50 and the stator core 30 are prevented from moving relative to each other in the axial direction of the stator core 30.

The stator 20 according to the present embodiment has the same advantages as the stator 20 according to the first embodiment.

In addition, the axial length of each of the engaging portions 58a and 58b in the present embodiment is substantially half that of the engaging portions 52a and 52b in the first embodiment. Consequently, compared to the first embodiment, the pressing load required for plastically deforming each individual engaging portion of the outer cylinder 50 can be reduced substantially by half, thereby more reliably preventing the stator core 30 from being damaged by an excessive pressing load which otherwise may be applied thereto via the engaging portions of the outer cylinder 50. Moreover, with the reduction in the required pressing load, it is also possible to further reduce the size and thus the cost of the press machine.

Sixth Embodiment

This embodiment illustrates a method of manufacturing a stator 20 that has almost the same structure as the stator 20 according to the second embodiment.

Figure 25:
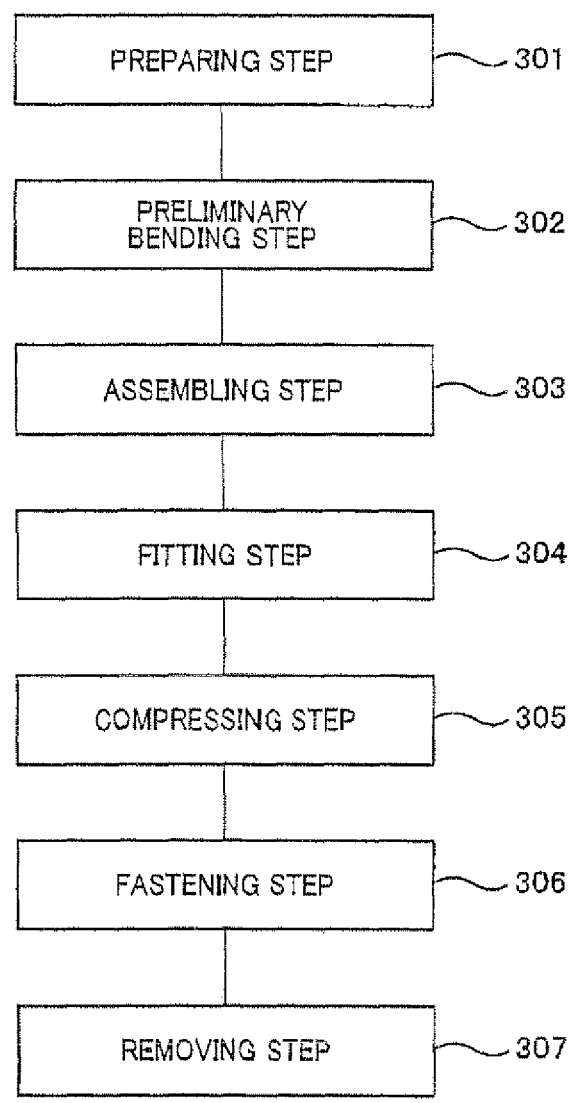
FIG. 25 is a flow chart illustrating a method of manufacturing a stator according to a sixth embodiment.
Figure 27:
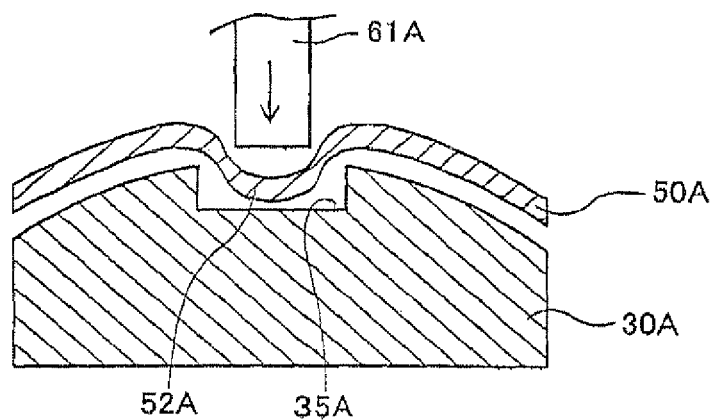
FIG. 27 is a schematic view illustrating a method of fastening an outer cylinder onto a stator core according to the related art.

As shown in FIG. 25, the method according to the present embodiment includes a preparing step 301, a preliminary bending step 302, an assembling step 303, a fitting step 304, a compressing step 305, a fastening step 306, and a removing step 307.

In the preparing step 301, the stator core segments 32 (i.e., the stator core 30), the hollow cylindrical stator coil 40, and the outer cylinder 50 are prepared.

In addition, the outer cylinder 50 prepared in this step has the slit 51 and the engaging portions 52a and 52b formed therein. The slit 51 and the engaging portions 52a and 52b in the present embodiment are respectively identical to those in the second embodiment (see FIG. 15). On the other hand, one of the stator core segments 32 prepared in this step has the recess 35 formed therein. The recess 35 in the present embodiment is slightly different from that in the second embodiment. More specifically, the recess 35 in the present embodiment has its circumferential side walls extending substantially perpendicular to its bottom wall (see FIG. 26B2), whereas the recess 35 in the second embodiment has its circumferential side walls extending obliquely with respect to its bottom wall (see FIG. 16).

In the preliminary bending step 302, the engaging portions 52a and 52b of the outer cylinder 50 are bent by a predetermined amount, using a punch (not shown), thereby being plastically deformed radially inward as shown in FIG. 26A.

The predetermined amount of preliminary bending is set so as to allow the engaging portions 52a and 52b to be reliably brought into contact with the corresponding circumferential side walls of the recess 35 in the fastening step 306 as well as to allow the outer cylinder 50 to be easily fitted onto the radially outer surface of the stator core 30 in the fitting step 304. More specifically, in the present embodiment, the predetermined amount of preliminary bending is set so that when the outer cylinder 50 is fitted on the radially outer surface of the stator core 30, the engaging portions 52a and 52b are in contact with or separated by a predetermined distance from the radially outer edges of the corresponding circumferential side walls of the recess 35.

In addition, in terms of improving the productivity, the preliminary bending step 202 is preferably performed immediately after the formation of the slit 51 in the outer cylinder 50 in the preparing step 201.

In the assembling step 303, the stator core 30 is assembled to the stator coil 40 as shown in FIG. 7.

Specifically, in this step, the tooth portions 33 of the stator core segments 32 are respectively inserted into the spaces formed between stacks of the in-slot portions 45a of the electric wires 45 from the radially outside of the stator coil 40; each of the stacks includes twelve radially-aligned in-slot portions 45a of the electric wires 45. Consequently, the stator core segments 32 are placed together to make up the hollow cylindrical stator core 30.

Figure 2:
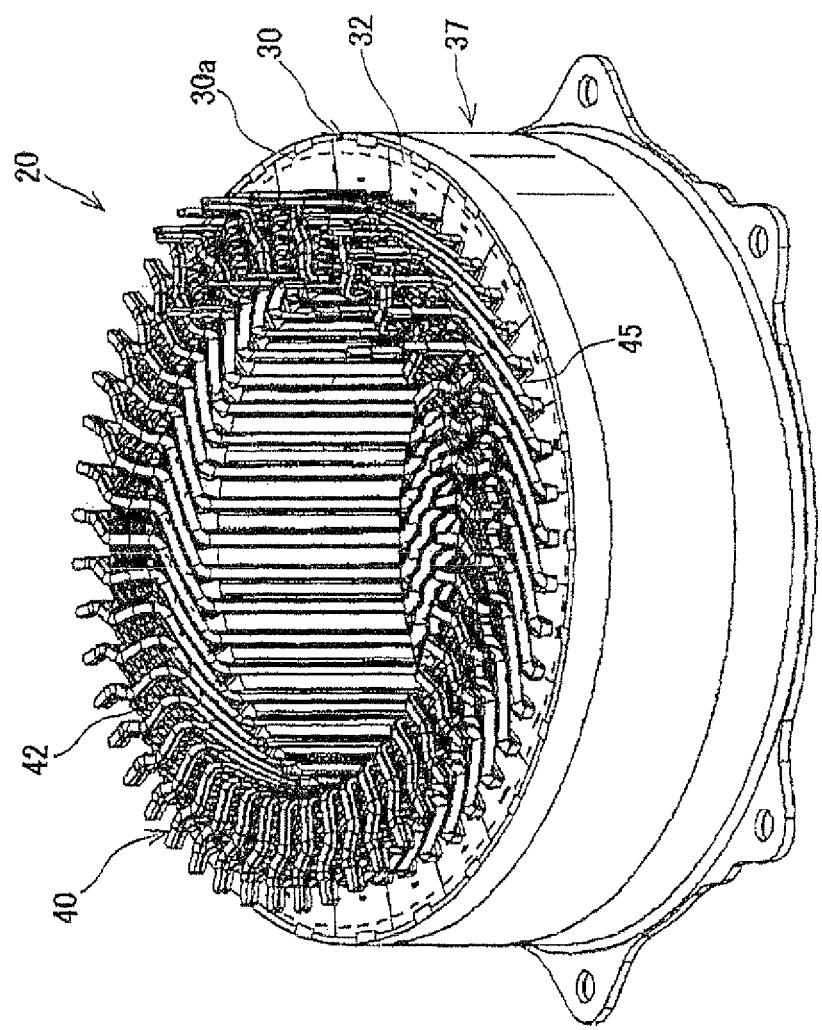
FIG. 2 is a perspective view of the stator.

In the fitting step 304, the outer cylinder 50 is axially fitted onto the radially outer surface of the stator core 30 so that the engaging portions 52a and 52b of the outer cylinder 50 are brought into alignment with the recess 35 of the stator core 30 as shown in FIGS. 26B1 and 26B2.

More specifically, in this step, the first slit 51a of the outer cylinder 50, by which the engaging portions 52a and 52b are demarcated from each other, is positioned at the circumferential center of the recess 35 of the stator core 30.

In the compressing step 305, as shown in FIG. 26C1, the outer cylinder 50 is compressed radially inward by a plurality of dies 63 that are arranged on the radially outside of the outer cylinder 50. Consequently, the outer cylinder 50 is elastically deformed so that the engaging portions 52a and 52b are circumferentially moved toward each other as shown in FIG. 26C2, thereby reducing the distance therebetween.

In the fastening step 306, the outer cylinder 50 and the stator core 30 are fastened together.

Specifically, in this step, as shown in FIG. 26D1, with the outer cylinder 50 kept compressed by the dies 63, a punch 62 is placed on the radially outside of the first slit 51a of the outer cylinder 50 and pressed against both the engaging portions 52a and 52b of the outer cylinder 50 radially inward. Consequently, as shown in FIG. 26D2, both the engaging portions 52a and 52b of the outer cylinder 50 are plastically deformed radially inward into the recess 35 of the stator core 30, so that they are brought into contact with the corresponding side walls of the recess 35 to engage with the corresponding side walls. In addition, each of the engaging portions 52a and 52b is plastically deformed to form, in its radially inner surface, an engaging step 59 that engages with the radially outer edge of the corresponding circumferential side wall of the recess 35.

In the removing step 307, as shown in FIG. 26E1, the punch 62 and the dies 63 are removed from the outer cylinder 50 radially outward, thereby releasing the outer cylinder 50 from the compressed state.

Consequently, as shown in FIG. 26E2, the outer cylinder 50 is elastically restored radially outward; the engaging portions 52a and 52b are circumferentially moved away from each other, thereby bringing the engaging steps 59 formed therein respectively into pressed-contact with the radially outer edges of the corresponding circumferential side walls of the recess 35. As a result, the outer cylinder 50 and the stator core 30 are firmly fastened together.

As a result, the stator 20 according to the present embodiment is obtained.

With the above method according to the present embodiment, it is possible to achieve the same advantages as with the method according to the first embodiment.

Moreover, compared to the method according to the first embodiment, the method according to the present embodiment further includes the preliminary bending step 302 in which the engaging portions 52a and 52b of the outer cylinder 50 are preliminarily bent and thereby plastically deformed radially inward by the predetermined amount.

Consequently, in the fastening step 306, it is possible to suppress increase in the radial gaps between the engaging portions 52a and 52b of the outer cylinder 50 and the stator core 30 due to spring back of the engaging portions 52a and 52b. As a result, it is possible to allow the engaging portions 52a and 52b to more reliably engage with the corresponding side walls of the recess 35, thereby more firmly fastening the outer cylinder 50 and the stator core 30 together.

Furthermore, the method according to the present embodiment further includes the compressing step 305 in which the outer cylinder 50 is compressed and thereby elastically deformed radially inward. Further, the fastening step 306 is performed with the outer cylinder 50 kept in the compressed state.

Consequently, after the outer cylinder 50 is released from the compressed state in the removing step 307, the engaging portions 52a and 52b will be circumferentially moved away from each other, thereby bringing the engaging steps 59 formed therein respectively into pressed-contact with the radially outer edges of the corresponding circumferential side walls of the recess 35. As a result, the outer cylinder 50 and the stator core 30 can be more firmly fastened together.

In addition, in the present embodiment, in the fastening step 306, each of the engaging portions 52a and 52b is plastically deformed to form, in its radially inner surface, the engaging step 59 that engages with the radially outer edge of the corresponding circumferential side wall of the recess 35.

Consequently, after the outer cylinder 50 is released from the compressed state in the removing step 307, the engaging steps 59 of the engaging portions 52a and 52b will be respectively brought into pressed-contact with the radially outer edges of the corresponding circumferential side walls of the recess 35. As a result, the outer cylinder 50 and the stator core 30 can be more firmly fastened together.

Modification to Second to Sixth Embodiments

In the stators 20 according to the second to the sixth embodiments, only one of the stator core segments 32 has the recess (or recesses) 35 formed in the radially outer surface thereof. The outer cylinder 50 has the engaging portions formed at only one spot thereof. The engaging portions of the outer cylinder are plastically deformed radially inward into the recess (or recesses) 35 formed in the stator core segment 32.

However, the stators 20 may also be modified so that: each the stator core segments 32 has the recess (or recesses) 35 formed in the radially outer surface thereof; the outer cylinder 50 has the engaging portions at each of a plurality of spots thereof; and the engaging portions of the outer cylinder 50 are plastically deformed radially inward into corresponding ones of the recesses 35 formed in the stator core segments 32. With such a modification, it is possible to more firmly fasten the outer cylinder 50 and the stator core 30 together. In particular, with each of the stator core segments 32 fastened to the outer cylinder 50, it is possible to more effectively retrain movement of the stator core segments 32 when external vibration is transmitted to the stator 20.

What is claimed is:

1. A stator for an electric rotating machine, the stator comprising:
a hollow cylindrical stator core comprised of a plurality of stator core segments that are arranged in a circumferential direction of the stator core to adjoin one another in the circumferential direction;
a stator coil mounted on the stator core; and
an outer cylinder that is fitted on radially outer surfaces of the stator core segments so as to fasten the stator core segments together,
wherein
the stator core has a recess formed in the radially outer surface of one of the stator core segments, the outer cylinder has a slit that radially penetrates the outer cylinder to connect radially outer and inner surfaces of the outer cylinder and an engaging portion that adjoins the slit, the engaging portion of the outer cylinder is plastically deformed radially inward into the recess of the stator core so as to abut and thereby engage with side walls of the recess which face the engaging portion, and the slit defines two opposed surfaces that connect the radially outer and inner surfaces of the outer cylinder, and the two opposed surfaces extend along an axial direction of the stator core.

2. The stator as set forth in claim 1, wherein the slit of the outer cylinder comprises at least one first slit that extends in an axial direction of the stator core and at least a pair of second slits each of which extends in the circumferential direction of the stator core, and the first slit intersects the second slits and thereby connects the second slits with each other.

3. The stator as set forth in claim 2, wherein the first and second slits together form a substantially "I" shape.

4. The stator as set forth in claim 2, wherein the first and second slits together form a substantially "⊐" shape.

5. The stator as set forth in claim 2, wherein the slit of the outer cylinder comprises one first slit and three second slits, and the first and second slits together form a substantially "㹸" shape.

6. The stator as set forth in claim 2, wherein the slit of the outer cylinder comprises two first slits and three second slits, and the first and second slits together form a substantially reverse "S" shape.

7. The stator as set forth in claim 1, wherein the engaging portion of the outer cylinder is jointed to a bottom wall of the recess of the stator core.

8. The stator as set forth in claim 7, wherein the engaging portion of the outer cylinder is welded to the bottom wall of the recess of the stator core.

9. The stator as set forth in claim 1, wherein the side walls of the recess of the stator core, with which the engaging portion of the outer cylinder engages, comprise a circumferential side wall of the recess which faces the engaging portion in the circumferential direction of the stator core.

10. The stator as set forth in claim 1, wherein the stator core has a plurality of recesses that are respectively formed in the radially outer surfaces of the stator core segments, the outer cylinder has a plurality of slits, each of which radially penetrates the outer cylinder to connect the radially outer and inner surfaces of the outer cylinder, and a plurality of engaging portions each of which adjoins a corresponding one of the slits, and each of the engaging portions of the outer cylinder is plastically deformed radially inward into a corresponding one of the recesses of the stator core so as to abut and thereby engage with side walls of the corresponding recess which face the engaging portion.

11. A method of manufacturing a stator for an electric rotating machine, the method comprising the steps of:

preparing a plurality of stator core segments, a stator coil, and an outer cylinder;

assembling the stator core segments to the stator coil so that the stator core segments together make up a hollow cylindrical stator core;

fitting the outer cylinder onto a radially outer surface of the stator core; and fastening the outer cylinder and the stator core together, wherein one of the stator core segments prepared in the preparing step has a recess formed in a radially outer surface thereof, so that the stator core, which is made up of the stator core segments, also has the recess formed in the radially outer surface thereof, the outer cylinder prepared in the preparing step has a slit that radially penetrates the outer cylinder to connect radially outer and inner surfaces of the outer cylinder and an engaging portion that adjoins the slit, in the fitting step, the outer cylinder is axially fitted onto the radially outer surface of the stator core so that the engaging portion of the outer cylinder is brought into alignment with the recess of the stator core, in the fastening step, the engaging portion of the outer cylinder is plastically deformed radially inward into the recess of the stator core so as to abut and thereby engage with side walls of the recess which face the engaging portion, and the slit defines two opposed surfaces that connect the radially outer and inner surfaces of the outer cylinder, and the two opposed surfaces extend along an axial direction of the stator core.

12. The method as set forth in claim 11, further comprising, before the fastening step, a step of preliminary bending and thereby plastically deforming the engaging portion of the outer cylinder radially inward by a predetermined amount.

13. The method as set forth in claim 11, further comprising, after the fitting step and before the fastening step, a step of compressing and thereby elastically deforming the outer cylinder radially inward, and wherein the fastening step is performed with the outer cylinder kept in the compressed state.

14. The method as set forth in claim 11, wherein in the fastening step, the engaging portion of the outer cylinder is plastically deformed to form, in its inner surface, an engaging step that engages with a radially outer edge of a circumferential side wall of the recess.

* * * * *

UNITED STATES PATENT AND TRADEMARK OFFICE
CERTIFICATE OF CORRECTION

PATENT NO. : 9,136,746 B2
APPLICATION NO. : 14/315344
DATED : September 15, 2015
INVENTOR(S) : Ikuta et al.

Page 1 of 1

It is certified that error appears in the above-identified patent and that said Letters Patent is hereby corrected as shown below:

In the Specification

Column 17, line 67:

Change "make up a substantially " 王 "'-shaped slit 55" to --make up a substantially " 王 "-shaped slit 55--

In the Claims

Column 23, lines 26-27:

Change "and the first and second slits together form a substantially " 王 "' shape" to --and the first and second slits together form a substantially " 王 " shape--

Signed and Sealed this
Sixteenth Day of August, 2016

Michelle K. Lee
*Director of the United States Patent and Trademark Office*